(12) United States Patent
Nomura et al.

(10) Patent No.: US 10,632,374 B2
(45) Date of Patent: Apr. 28, 2020

(54) INFORMATION PROCESSING APPARATUS AND USER INFORMATION DISPLAYING METHOD

(71) Applicant: Sony Interactive Entertainment Inc., Tokyo (JP)

(72) Inventors: Masanori Nomura, Tokyo (JP); Yuichi Yoshizawa, Tokyo (JP); Fumiaki Hisamatsu, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/329,791

(22) PCT Filed: Aug. 10, 2015

(86) PCT No.: PCT/JP2015/072688
§ 371 (c)(1),
(2) Date: Jan. 27, 2017

(87) PCT Pub. No.: WO2016/024572
PCT Pub. Date: Feb. 18, 2016

(65) Prior Publication Data
US 2017/0209791 A1    Jul. 27, 2017

(30) Foreign Application Priority Data
Aug. 14, 2014    (JP) .................................. 2014-165266

(51) Int. Cl.
*A63F 13/34*    (2014.01)
*G06F 13/00*    (2006.01)
(Continued)

(52) U.S. Cl.
CPC ............ *A63F 13/34* (2014.09); *A63F 13/213* (2014.09); *A63F 13/79* (2014.09); *A63F 13/87* (2014.09);
(Continued)

(58) Field of Classification Search
CPC ........ A63F 13/34; A63F 13/213; A63F 13/79; A63F 13/87
See application file for complete search history.

(56) References Cited

U.S. PATENT DOCUMENTS 7,311,608 B1 *   12/2007   Danieli .................. A63F 13/12
                                                                      463/42
8,007,362 B2 *   8/2011    Aoyama ................ A63F 13/12
                                                                      463/34
(Continued)

FOREIGN PATENT DOCUMENTS

CN            1383078 A       12/2002
CN         101262915 A        9/2008
(Continued)

OTHER PUBLICATIONS

Inventor: Nobuyuki Yasue, JP 2007-325630 Translation, pp. 1-28, Published Dec. 20, 2007.*
(Continued)

*Primary Examiner* — Omkar A Deodhar
*Assistant Examiner* — Shauna-Kay Hall
(74) *Attorney, Agent, or Firm* — Matthew B. Dernier, Esq.

(57) ABSTRACT

On a participation member screen image of a chat room, user information is displayed such that a host user and a guest user who perform share play can be specified. In a member information area, an information displaying field for the host user and an information displaying field for the guest user are disposed in a juxtaposed relationship from the uppermost stage, and a share play mark is added to the host user. Further, in a share play item, a check mark is displayed to indicate that share play is proceeding, and time information is displayed to indicate an implementation time period of the share play.

9 Claims, 31 Drawing Sheets

(51) Int. Cl.
*A63F 13/87* (2014.01)
*A63F 13/79* (2014.01)
*A63F 13/213* (2014.01)
*G06F 13/40* (2006.01)
*G06F 13/42* (2006.01)
*G06F 3/0482* (2013.01)

(52) U.S. Cl.
CPC ............ *G06F 3/0482* (2013.01); *G06F 13/00* (2013.01); *G06F 13/4068* (2013.01); *G06F 13/4282* (2013.01); *G06F 2213/0042* (2013.01)

(56) References Cited

U.S. PATENT DOCUMENTS

| | | | |
|---|---|---|---|
| 8,465,369 | B2 | 6/2013 | Kazuo |
| 8,849,912 | B2 | 9/2014 | Aonuma |
| 9,186,581 | B2 | 11/2015 | Araki |
| 9,669,310 | B2 | 6/2017 | Green |
| 9,827,493 | B2 | 11/2017 | Green |
| 10,130,890 | B2 | 11/2018 | Oshima |
| 2002/0160838 | A1 | 10/2002 | Kim |
| 2006/0058103 | A1 | 3/2006 | Danieli |
| 2006/0223600 | A1* | 10/2006 | Wisdom ................ A63F 13/10 463/1 |
| 2006/0256135 | A1 | 11/2006 | Aoyama |
| 2008/0004117 | A1 | 1/2008 | Stamper |
| 2009/0118016 | A1 | 5/2009 | Ben-Artzi |
| 2009/0291761 | A1* | 11/2009 | Hata ................ A63F 13/10 463/42 |
| 2010/0035691 | A1* | 2/2010 | Wild ................ H04L 67/24 463/42 |
| 2010/0046770 | A1 | 2/2010 | Chan et al. |
| 2010/0094900 | A1 | 4/2010 | Hughes, Jr. |
| 2010/0216131 | A1 | 8/2010 | Luthra et al. |
| 2010/0257450 | A1 | 10/2010 | Go |
| 2010/0321567 | A1 | 12/2010 | Tanaka |
| 2011/0083111 | A1* | 4/2011 | Forutanpour ........... H04W 4/21 715/863 |
| 2011/0263333 | A1* | 10/2011 | Dokei .................... A63F 13/86 463/42 |
| 2012/0075405 | A1 | 3/2012 | Sakai |
| 2012/0179884 | A1 | 7/2012 | Araki |
| 2012/0311041 | A1 | 12/2012 | Aonuma |
| 2013/0084985 | A1 | 4/2013 | Green |
| 2013/0130794 | A1 | 5/2013 | Oshima |
| 2014/0053078 | A1* | 2/2014 | Kannan ................ H04W 4/023 715/748 |
| 2014/0080560 | A1 | 3/2014 | Knutsson |
| 2014/0187314 | A1 | 7/2014 | Perry |
| 2014/0349753 | A1 | 11/2014 | Imai |
| 2015/0005054 | A1 | 1/2015 | Smalley |
| 2015/0281296 | A1 | 10/2015 | Takaichi |

FOREIGN PATENT DOCUMENTS

| | | |
|---|---|---|
| CN | 102890746 A | 1/2013 |
| CN | 103068451 A | 4/2013 |
| CN | 103902808 A | 7/2014 |
| EP | 2530904 A1 | 12/2012 |
| JP | 2007325630 A | 12/2007 |
| JP | 2011092623 A | 5/2011 |
| JP | 2011224204 A | 11/2011 |
| JP | 2012034793 A | 2/2012 |
| JP | 2012143269 A | 8/2012 |
| JP | 2012146279 A | 8/2012 |
| JP | 2012249810 A | 12/2012 |
| WO | 2013111245 A1 | 8/2013 |
| WO | 2013111246 A1 | 8/2013 |
| WO | 2013111247 A1 | 8/2013 |
| WO | 2013111248 A1 | 8/2013 |
| WO | 2013111249 A1 | 8/2013 |
| WO | 2014068806 A1 | 5/2014 |

OTHER PUBLICATIONS

International Search Report for related PCT Application No. PCT/JP2015/072682, 4 pages, dated Sep. 8, 2015.
International Search Report for related PCT Application No. PCT/JP2015/072685, 4 pages, dated Sep. 8, 2015.
International Search Report for corresponding PCT Application No. PCT/JP2015/072688, 4 pages, dated Sep. 8, 2015.
Office Action for related JP Application No. JP 2014-165263, 11 pages, dated Jan. 30, 2018.
Office Action for corresponding JP Application No. JP 2014-165266, 7 pages, dated Jan. 30, 2018.
Supplemental European Search Report for corresponding EP Application No. 15831588, 60 pages, dated Mar. 7, 2018.
International Preliminary Report on Patentability and Written Opinion for corresponding PCT Application No. PCT/JP2015/072688, 11 pages, dated Feb. 23, 2017.
International Preliminary Report on Patentability and Written Opinion for related PCT Application No. PCT/JP2015/072682, 13 pages, dated Feb. 23, 2017.
International Preliminary Report on Patentability and Written Opinion for related PCT Application No. PCT/JP2015/072685, 11 pages, dated Feb. 23, 2017.
Office Action for related U.S. Appl. No. 15/329,781, 27 pages, dated Oct. 19, 2018.
Office Action for related U.S. Appl. No. 15/329,173, 23 pages, dated Jul. 20, 2018.
Office Action for related U.S. Appl. No. 15/329,781, 19 pages, dated Mar. 29, 2018.
Office Action for related U.S. Appl. No. 15/329,781, 20 pages, dated Feb. 25, 2019.
Office Action for related U.S. Appl. No. 15/329,173, 26 pages, dated Feb. 26, 2019.
The first office action for corresponding CN Application No. 201580042560.6, 19 pages, dated Feb. 11, 2019.
Office Action for related U.S. Appl. No. 15/329,173, 12 pages, dated Oct. 7, 2019.

* cited by examiner

FIG.2
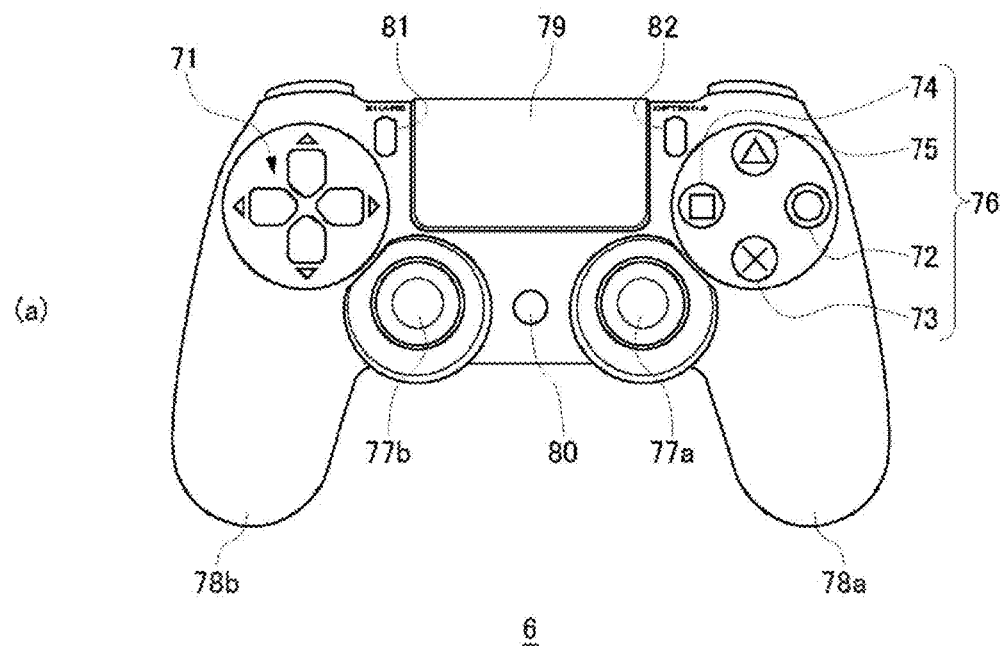
(a)
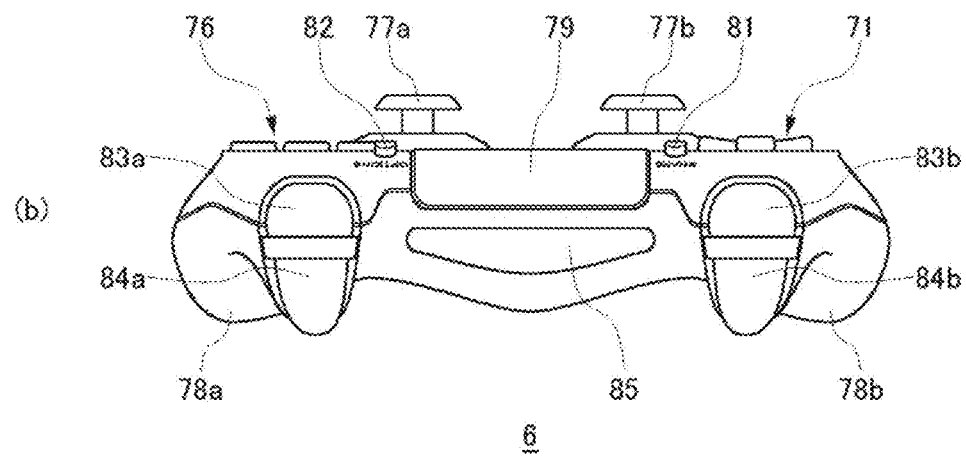
(b)

FIG. 12

WHAT IS SHARE PLAY?

IF SHARE PLAY IS USED, THEN TWO PLAYERS PARTICIPATING IN THE SAME CHAT CAN PLAY A GAME IN SUCH A MANNER THEY FEEL AS IF THEY WERE IN THE SAME ROOM. IN ORDER TO USE THE SHARE PLAY, YOU WILL BEGIN SHARE PLAY AS A HOST OR PARTICIPATE IN SHARE PLAY AS A GUEST. THE GUEST CAN VIEW A GAME SCREEN IMAGE OF THE HOST OR CAN PLAY A GAME IN PLACE OF THE HOST. IN A GAME READY FOR LOCAL MATCH PLAY, ALSO IT IS POSSIBLE FOR THE HOST AND THE GUEST TO PLAY THE SAME GAME TOGETHER.

OK

✕ RETURN ◯ DETERMINE

Battle Lover

SHARE PLAY IS STARTED. MADA
XYZ Fighting — 432

KAZUO
BATTLE3

RICHARD
SAMURAI Fighting

MIKE

JENNIFER WILSON
→ BATTLE3

TOM

TARO
WARSHIP2

SHARE PLAY

INVITE

ROOM SETTING

VIEW OTHER CHAT ROOM

LEAVE THIS CHAT ROOM

[OPTIONS] OPTION MENU

⊗ RETURN   ⊙ DETERMINE   △ VIEW TEXT CHAT   ▽ VIEW CHAT

THE CONTROLLER IS PASSED TO THE GUEST

HOW DO YOU PLAY THE GAME WITH GUEST?

- ● THE GUEST PLAYS IN PLACE OF YOU.
  YOU ARE HELPED BY THE GUEST IN A DIFFICULT SCENE,
  OR THE GUEST CAN EXPERIENCE THE GAME.
- ○ THE GAME IS PLAYED TOGETHER.
  YOU CAN ENJOY A LOCAL MULTIPLAYER GAME TOGETHER WITH THE GUEST.

<HINT>
· NEITHER VIDEOS NOR AUDIOS ARE TRANSMITTED TO THE GUEST WHILE YOU DISPLAY A SCREEN IMAGE OTHER THAN THE GAME.
· THE GUEST CAN OPERATE THE CONTROLLER ONLY WHILE THE GAME SCREEN IMAGE IS DISPLAYED.

[ CANCEL ]    [ OK ]

ⓧ RETURN  ⊙ DETERMINE 449a, 449b, 4a

INFORMATION PROCESSING APPARATUS AND USER INFORMATION DISPLAYING METHOD

TECHNICAL FIELD

The present invention relates to an information processing technology for distributing a content image which is being executed to share the content image between a plurality of users.

BACKGROUND ART

In recent years, a service by which a moving image created or captured by a user is made public has become popular. Also it has become possible to couple terminals of users by peer-to-peer (P2P) connection so that the users can communicate directly with each other. The users can utilize such a mechanism as just described to exchange various data with other users through the Internet.

Further, an environment in which a plurality of users play a game together through the Internet has been created, and such a network service of a game as just described has already become a role as a communication tool. PTL 1 proposes a game distribution system wherein a game apparatus of a distribution source can distribute information relating to a play situation of a game to a game apparatus of a reception side and a user of the reception side can take part in the game being executed by the game apparatus of the distribution source.

CITATION LIST

Patent Literature

[PTL 1] Japanese Patent Laid-Open No. 2012-34793

SUMMARY

Technical Problem

The inventor of the present invention has paid attention to the possibility of a technology for sharing a content image such as a game image by a plurality of users. If an image of a game being played by a host user is simultaneously viewed by a guest user or users, then the plurality of users can enjoy the same game image even if they are at remote places from each other.

When such a content image as described above is to be shared, preferably a system can provide various sharing modes such that needs by the host user side and the needs by the guest user side are satisfied. That various sharing modes can be provided increases the usefulness of the system, and as a result, the value of the system is raised. Where a system provides a sharing service of a game image, it is important to develop a user interface which allows not only a host user and a guest user but also other users to understand an execution state of the sharing service easily.

Further, although it is sure that the sharing service is highly convenient to its users, if sharing of a game image is admitted indefinitely, then this may possibly impair the fairness with users who have purchased the game program regularly or users who subscribe to paid services. Therefore, where a sharing service is carried out, a contrivance which ensures the fairness among users is demanded.

It is to be noted that, in a field in which videos of movies or games are handled, a viewing age limit is set in order to prevent children from freely viewing or utilizing inappropriate videos. Criteria for such limitation are set for each country, and therefore, such a situation possibly occurs that, depending upon an age, a video which can be viewed in a certain country is inhibited from viewing in a different country. Further, in a game apparatus, in order for a parent as a guardian to limit a child from playing a game, there is provided a parental control function which enables the guardian to limit for the child to play a game which is considered inappropriate. When it is tried to implement a sharing service, since a game image is sometimes viewed in different countries, it is necessary to take the circumstances of the countries into consideration. Further, even where a game image is not viewed in different countries, it is necessary to carry out the sharing service taking various circumstances into consideration.

Therefore, it is an object of the present invention to provide a technology which effectively implements sharing of a content image.

Solution to Problem

In order to solve the problem described above, the information processing apparatus of a certain aspect of the present invention is an information processing apparatus operated by a user, including an information acquisition unit configured to acquire user information relating to a different user, and a display unit configured to display at least the user information relating to the different user. Where a content image of a first user is shared by a second user, the display unit displays the user information relating to the different user such that it can be specified whether the different user is the first user or the second user.

Another aspect of the present invention is a user information displaying method of displaying user information on an information processing apparatus operated by a user, including a step of acquiring user information relating to a different user, and a step of displaying at least the user information relating to the different user. Where a content image of a first user is shared by a second user, the displaying step displays the user information relating to the different user such that it can be specified whether the different user is the first user or the second user.

It is to be noted that also arbitrary combinations of the constituent elements described above and the representations of the present invention obtained by conversion thereof between a method, an apparatus, a system, a recording medium, a computer program and so forth are effective as modes of the present invention.

BRIEF DESCRIPTION OF DRAWINGS

FIG. 2(a) is a diagram depicting an appearance configuration of an upper face of an inputting apparatus, and (b) is a diagram depicting an appearance configuration of a rear face of the inputting apparatus.

FIG. 12 is a view depicting an explanation screen image of shared play.

FIG. 13 is a view depicting a member screen image.

FIG. 27 is a view depicting an example of a dialog screen image.

DESCRIPTION OF EMBODIMENT

Figure 1:
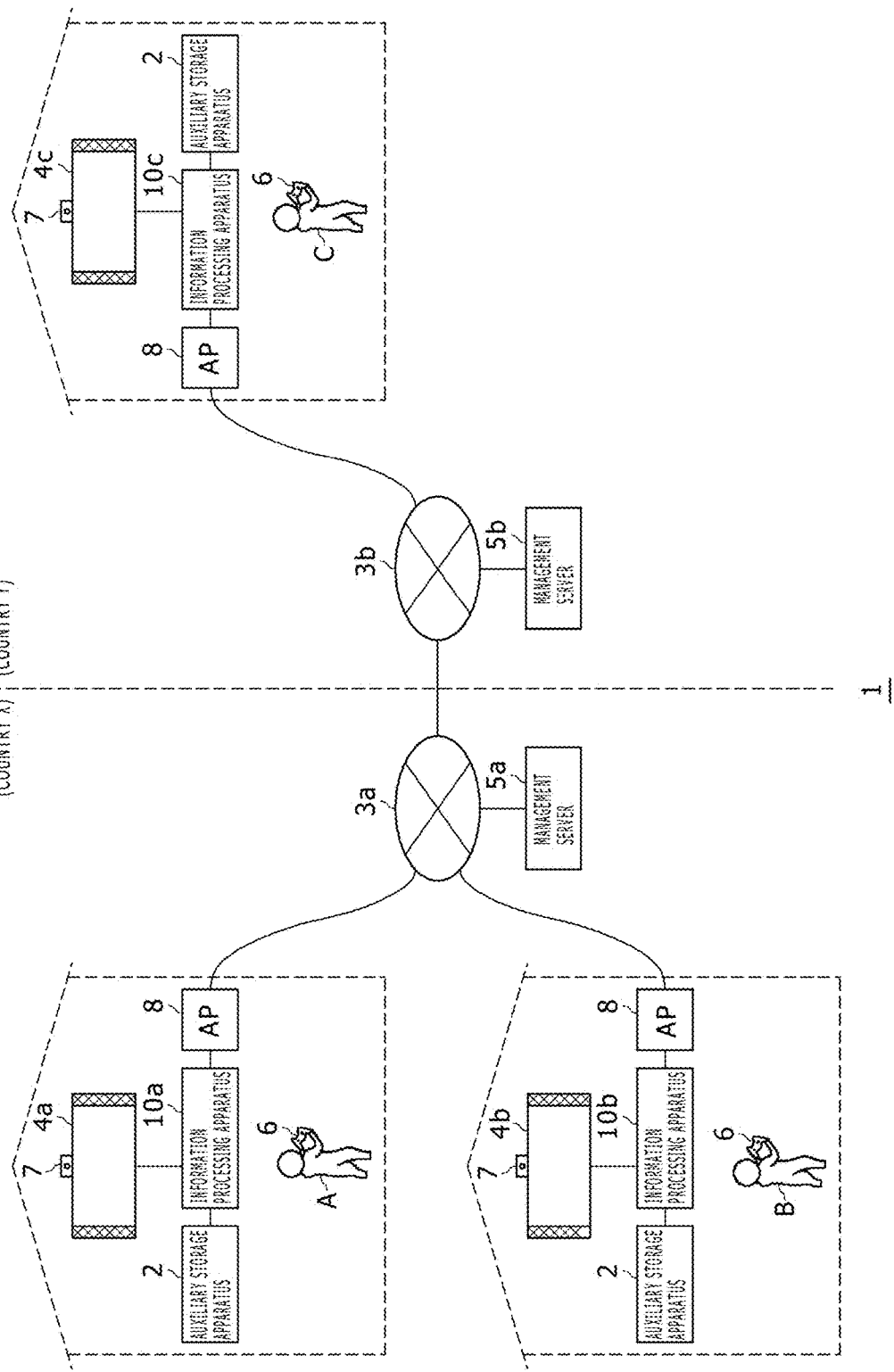
FIG. 1 is a diagram depicting an information processing system according to an embodiment of the present invention.

FIG. 1 depicts an information processing system 1 according to an embodiment of the present invention. The information processing system 1 includes information processing apparatus 10a, 10b and 10c (where they are not specifically distinguished from each other, each of them is hereinafter referred to as "information processing apparatus 10") which are operated by users A, B and C, respectively, and management servers 5a and 5b (where they are not specifically distinguished from each other, each of them is hereinafter referred to as "management server 5"). The information processing apparatus 10a, 10b and 10c and the management servers 5a and 5b are connected to each other through networks 3a and 3b such as the Internet or a LAN (Local Area Network). An access point (hereinafter referred to as "AP") 8 has functions of a wireless access point and a router, and each of the information processing apparatus 10 is connected to the AP 8 by a wireless or wire connection such that it is connected for communication with the management servers 5 on the networks 3a and 3b or another information processing apparatus 10 operated by a different user.

The information processing apparatus 10 establishes connection to an inputting apparatus 6, which is operated by a user, by wireless or wire connection, and the inputting apparatus 6 provides the information processing apparatus 10 with operation information representative of a result of the operation of the user. If the information processing apparatus 10 accepts operation information from the inputting apparatus 6, then it reflects the operation information on processing of system software or application software, and a result of the processing is outputted from an outputting apparatus. In the information processing system 1, the information processing apparatus 10 may be a game apparatus which executes a game, and the inputting apparatus 6 may be an apparatus which supplies operation information of the user to the information processing apparatus 10 such as a game controller. In the information processing system 1, the information processing apparatus 10 of one user streaming distributes game image data of a game being played to the information processing apparatus 10 of the different users. Accordingly, the information processing system 1 in the present embodiment operates as a game image distribution system.

It is necessary for each user in the information processing system 1 to log in to an OS (Operating System; system software) of the information processing apparatus 10 in order to execute an application of a game or the like. The user who logs in to the system software is managed by a user account registered in the information processing apparatus 10.

An auxiliary storage apparatus 2 is a large capacity storage apparatus such as an HDD (Hard Disk Drive) or a flash memory and may be an external storage apparatus connected to the information processing apparatus 10 by a USB (Universal Serial Bus) or may be a built-in type storage apparatus. The outputting apparatus 4 may be a television set having a display unit which outputs an image and a speaker which outputs sound or may be a computer display unit. The outputting apparatus 4 may be connected to the information processing apparatus 10 by a wire cable or by wireless connection.

The inputting apparatus 6 includes a plurality of inputting units such as a plurality of operation buttons of the push type, an analog stick which can input an analog quantity and turning buttons. A camera 7 which is an image pickup apparatus is provided in the proximity of the outputting apparatus 4 and picks up an image of a space around the outputting apparatus 4. While FIG. 1 depicts an example wherein the camera 7 is attached to an upper portion of the outputting apparatus 4, the camera 7 may otherwise be disposed sidewardly of the outputting apparatus 4. Whatever the case may be, the camera 7 is disposed at a position at which the camera 7 can pick up an image of a user who plays a game in front of the outputting apparatus 4. It is to be noted that the camera 7 may be a stereo camera.

In recent years, thanks to increase of the speed of the Internet, it has become possible also for users of different countries to communicate with each other on the real time basis. In the information processing system 1, it is possible for a plurality of users to utilize an application for chat to enjoy voice chat or text chat or to transmit camera images to each other to enjoy video chat.

In the information processing system 1, the information processing apparatus 10a, 10b and 10c individually activate a chat application, and the users A, B and C are chatting with one another. In a state in which the users A, B and C chat with one another in this manner, one user (host user) can share a game image with one different user (guest user). For example, if a game image of the user A is distributed from the information processing apparatus 10a to the information processing apparatus 10c during game play of the user A, then the user C can view the game image of the user A. In the present embodiment, that content image data processed by the information processing apparatus 10a is transmitted to the different information processing apparatus 10c to establish a state in which the user A and the user C can view a content image together with each other is referred to as "sharing of a content image." It is to be noted that, although the information processing apparatus 10a and the information processing apparatus 10c may be connected to each other by a P2P connection to perform transmission and reception of data, transmission and reception of data may be performed through the management server 5.

The information processing system 1 makes it possible for users of different countries to transmit and receive data on the real time basis. In FIG. 1, a manner is illustrated in which the users A and B are residents of a country X and the management server 5a manages the users A and B connected to the network 3a while the user C is a resident of another country Y and the management server 5b manages the user C connected to the network 3b. It is to be noted that, while the management servers 5 here are installed in different countries and the management servers 5 manage the users in accordance with criteria (for example, viewing age limit) provided in the individual countries, each management server 5 may be installed not for each country but for each district of each country or may be installed for each region including a plurality of countries.

In the present embodiment, the management servers 5 provide various services to users for individual countries (or individual regions).

First, each management server 5 provides a network service of a game to users of the information processing system 1. The management server 5 manages network accounts for identifying the users, and each user would use its network account to sign in to the network service provided by the management server 5. In this sense, each user is managed by the management server 5 in the country in which the user lives.

If a login user signs in to the network service from its information processing apparatus 10, then the login user can register save data of a game or a virtual award item (trophy) acquired during game play into the management server 5. In the present embodiment, in order for each information processing apparatus 10 to communicate with a different information processing apparatus 10, it is assumed that a user signs in to the management server 5. Accordingly, if the user does not sign in to the management server 5 of the country of the user itself, then the user is not permitted to perform chat with a different user or to perform sharing of a content image.

The management server 5 functions also as a server which sells and manages a content of a game or the like. The management server 5 functions as an on-line shop of a content and provides, if it receives a content purchase request from an information processing apparatus 10, the content to the information processing apparatus 10 through the network 3. The information processing apparatus 10 can execute the content by downloading the content from the management server 5. It is to be noted that, as described hereinabove, the criteria for viewing age limit are set for each country (region), and the management server 5 performs processing of sales, management and so forth of a content in accordance with the criteria of the own country. For example, it may possibly occur that, although a content can be purchased by a user of 15 years old in the country X, it cannot be purchased in the country Y. Especially, with regard to a computer game, since a rating system is introduced in each country, the management server 5 performs sales and management of a content in accordance with the rating system of the own country.

Further, the management server 5 may sell a content at a discount price to users or may provide a paid service by which a user can freely enjoy a service for a fixed period of time. A user can join into the paid service by paying a fixed amount of money every month and can enjoy various privileges provided by the paid service.

In this manner, the management server 5 provides various services to users. In FIG. 1, since the management server 5 is indicated as a single server which comprehensively provides various services, in actual operation, a server may be provided for each service. Where a server is provided for each service, cooperation of information is performed between the servers, and from the point of view of users, preferably the system is constructed such that the users need not be conscious of to which one of the servers the users are accessing.

FIG. 2(a) depicts an appearance configuration of an upper face of the inputting apparatus. The user would grasp a left side grip portion 78b by the left hand and grasp a right side grip portion 78a by the right hand to operate the inputting apparatus 6. On an upper face of a housing of the inputting apparatus 6, a direction key 71, analog sticks 77a and 77b and four different operation buttons 76 which are inputting units are provided. Four buttons 72 to 75 have different figures marked with different colors thereon in order to allow distinction thereof from one another. In particular, the circle button 72 is marked with a red round mark; the cross button 73 with a blue cross mark; the square button 74 with a purple square mark; and the triangular button 75 with a green triangle mark. On the upper face of the housing, a touch pad 79 is provided in a flat region between the direction key 71 and the operation buttons 76. The touch pad 79 functions also as a depression type button which sinks downwardly when it is pushed by the user and returns to its original position when it is released by the user.

A function button 80 is provided between the two analog sticks 77a and 77b. The function button 80 is used to turn on the power supply to the inputting apparatus 6 and simultaneously make active a communication function of connecting the inputting apparatus 6 and the information processing apparatus 10 to each other. After the inputting apparatus 6 is connected to the information processing apparatus 10, the function button 80 is used also to cause the information processing apparatus 10 to display a home screen image.

A SHARE button 81 is provided between the touch pad 79 and the direction key 71. The SHARE button 81 is utilized to input an instruction from the user to an OS or the system software in the information processing apparatus 10. An OPTIONS button 82 is provided between the touch pad 79 and the operation buttons 76. The OPTIONS button 82 is utilized to input an instruction from the user to application (game) software executed by the information processing apparatus 10. The SHARE button 81 and the OPTIONS button 82 may each be formed as a push-type button.

FIG. 2(b) depicts an appearance configuration of a rear face of the inputting apparatus. On the upper side of the rear face of the housing of the inputting apparatus 6, the touch pad 79 is provided so as to extend from the upper face of the housing, and a horizontally elongated light emitting unit 85 is provided on the lower side of the rear face of the housing. The light emitting unit 85 has LEDs (Light Emitting Diodes) of red (R), green (G) and blue (B) and is turned on in accordance with emission light color information transmitted thereto from the information processing apparatus 10. On the rear face of the housing, an upper side button 83a and a lower side button 84a, and another upper side button 83b and another lower side button 84b are provided at positions in a leftwardly and rightwardly symmetrical relationship in a longitudinal direction. The upper side button 83a and the lower side button 84a are operated by the forefinger and the middle finger of the right hand of the user, respectively, and the upper side button 83b and the lower side button 84b are operated by the forefinger and the middle finger of the left hand of the user, respectively. The upper side buttons 83 may be configured as push-type buttons while the lower side buttons 84 may be configured as trigger type buttons supported for pivotal motion.

Figure 3:
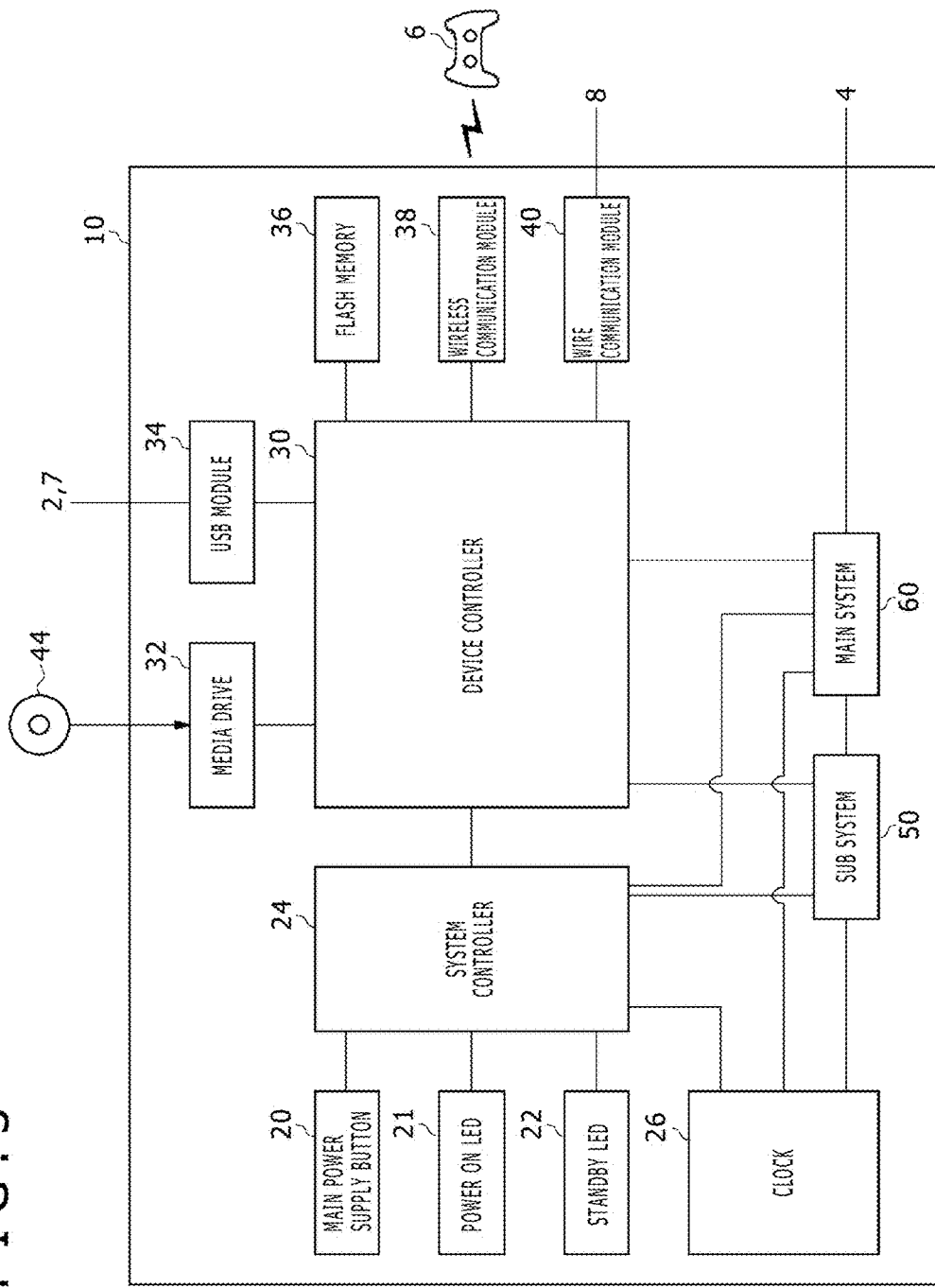
FIG. 3 is a diagram depicting functional blocks of an information processing apparatus.

FIG. 3 depicts a functional block diagram of the information processing apparatus 10. The information processing apparatus 10 includes a main power supply button 20, a power ON LED 21, a standby LED 22, a system controller 24, a clock 26, a device controller 30, a media drive 32, a USB module 34, a flash memory 36, a wireless communication module 38, a wire communication module 40, a sub system 50 and a main system 60.

The main system 60 includes a main CPU (Central Processing Unit), a memory which is a main storage apparatus and a memory controller, a GPU (Graphics Processing Unit) and so forth. The GPU is utilized principally for arithmetic processing of a game program. Those functions may be configured as a system-on-chip and formed on one chip. The main CPU has a function for executing a game program recorded in the auxiliary storage apparatus 2.

The sub system 50 includes a sub CPU, a memory which is a main storage apparatus, a memory controller and so forth, but does not include a GPU and does not have a function for executing a game program. The number of circuit gates of the sub CPU is smaller than the circuit gate number of the main CPU, and the operation power consumption of the sub CPU is lower than the operation power consumption of the main CPU. The sub CPU operates also while the main CPU is in a standby state and is limited in processing function thereof so as to suppress the power consumption low.

The main power supply button 20 is an inputting unit through which an operation input is performed by a user and is provided on the front face of the housing of the information processing apparatus 10. The main power supply button 20 is operated in order to turn on or off power supply to the main system 60 of the information processing apparatus 10. The power ON LED 21 is turned on when the main power supply button 20 is switched on, and the standby LED 22 is turned on when the main power supply button 20 is switched off.

The system controller 24 detects depression of the main power supply button 20 by a user. If the main power supply button 20 is depressed when the main power supply is in an off state, then the system controller 24 acquires the depression operation as a "turn on instruction," but if the main power supply button 20 is depressed when the main power supply is in an on state, then the system controller 24 acquires the depression operation as a "turn off instruction."

The clock 26 is a real time clock, and generates date and time information at present and supplies the generated information to the system controller 24, sub system 50 and main system 60. The device controller 30 is configured as an LSI (Large-Scale Integrated Circuit) which executes delivery of information between devices like a south bridge. As depicted in the figure, such devices as the system controller 24, media drive 32, USB module 34, flash memory 36, wireless communication module 38, wire communication module 40, sub system 50 and main system 60 are connected to the device controller 30. The device controller 30 absorbs a difference in electric characteristic or a difference in data transfer rate between the devices and controls the timing of data transfer.

The media drive 32 is a drive apparatus which operates a ROM (Read Only Memory) medium 44, on which application software of a game or the like and license information are recorded, loaded thereon to read out a program, data and so forth from the ROM medium 44. The ROM medium 44 is a read-only recording medium such as an optical disk, a magneto-optical disk or a Blu-ray disk.

The USB module 34 is a module to be connected to an external apparatus by a USB cable. The USB module 34 may be connected to the auxiliary storage apparatus 2 and the camera 7 by a USB cable. The flash memory 36 is an auxiliary storage apparatus which configures an internal storage. The wireless communication module 38 wirelessly communicates, for example, with the inputting apparatus 6 using a communication protocol such as a Bluetooth (registered trademark) protocol or an IEEE (Institute of Electrical and Electronics Engineers) 802.11 protocol. It is to be noted that the wireless communication module 38 may be compatible with a third generation (3rd Generation) digital portable telephone system compliant with the IMT-2000 (International Mobile Telecommunication 2000) standard prescribed by the ITU (International Telecommunication Union) or may be compatible with a different generation digital portable telephone system. The wire communication module 40 wire-communicates with an external apparatus and is connected to an external network, for example, through the AP 8.

In the information processing system 1 of the present embodiment, a plurality of information processing apparatus 10 of different users execute a chat application and are connected to each other by P2P connection. In this state, the users can communicate with each other by voice chat, text chat or the like. It is to be noted that each user can enjoy chat with a different user simultaneously while the user enjoys a game by itself, and can also share a game image with a different user who is in chat connection with the user.

Further, in the present embodiment, a plurality of modes are prepared for sharing of a game image. In the following description, to share a game image is sometimes referred to as "share play" for the convenience of description. It is to be noted that, in share play, a user of a distribution source of a game image is referred to as "host" or "host user" and a user of a distribution destination is referred to as "guest" or "guest user." In the description given below, three modes of share play are described. In the share play, a guest user receives a game image provided from the host user and may not have the game software. It is to be noted that the share play in the present embodiment assumes that the host user and the guest user are in chat connection and can communicate with each other through chat while they perform share play.

<Share Play 1>

The first share play may be called "share screen," in which a game image of the host user is shared with the guest user. The share screen is a basic mode of share play, and upon starting of share play, the share screen is first set as a sharing mode. In the share screen, although the guest user can view a game image of the host user, the guest user cannot perform game operation.

Accordingly, the share play 1 is a sharing mode in which, while the host user and the guest user share a game image of the host user, the guest user does not have the control right of the game.

The following share plays 2 and 3 are sharing modes in which the control right of a game is passed to the guest user while the share screen function of the share play 1 is presupposed.

<Share Play 2>

The second share play may be called "assist play," in which, while a game image of the host user is shared with the guest user, the guest user performs a game operation in place of the host user.

In the assist play, the host user passes the control right of an own game to the guest user, and accordingly, the host user cannot operate the game while only the guest user can perform a game operation.

Accordingly, the share play 2 is considered a sharing mode in which, while the host user and the guest user share a game image of the host user, the control right of the game is passed to the guest user in place of the host user.

<Share Play 3>

The third share play may be called "joint play," in which, while a game image of the host user is shared with the guest user, the guest user participates as a new player in the game and plays the game together with the host user. In other words, in the joint play, the host user and the guest user can participate as player 1 and player 2, respectively, in a game making use of game resources of the host user side such that the host user and the guest user can operate the game together with each other.

Accordingly, the share play 3 is considered a sharing mode in which, while the host user and the guest user share a game image of the host user, both of the host user and the guest user simultaneously have the control right of the game.

In the following, a configuration of the information processing apparatus 10 of the host user and a configuration of the information processing apparatus 10 of the guest user are described, and a mechanism in which share play is performed between the host user and the guest user is described. It is to be noted that, in the example described below, a case is described in which the user A acts as the host user and the user C acts as the guest user. Naturally, however, in the information processing system 1, also it is possible for the user C to act as the host user and also it is possible for the user A to act as the guest user. Also it is possible for some other user, for example, the user B or a different user not depicted to act as any of the host user and the guest user similarly. Accordingly, it is additionally remarked that, in the following description, the configuration described as that of the information processing apparatus 10a or the information processing apparatus 10c is provided in all of the information processing apparatus 10.

Figure 4:
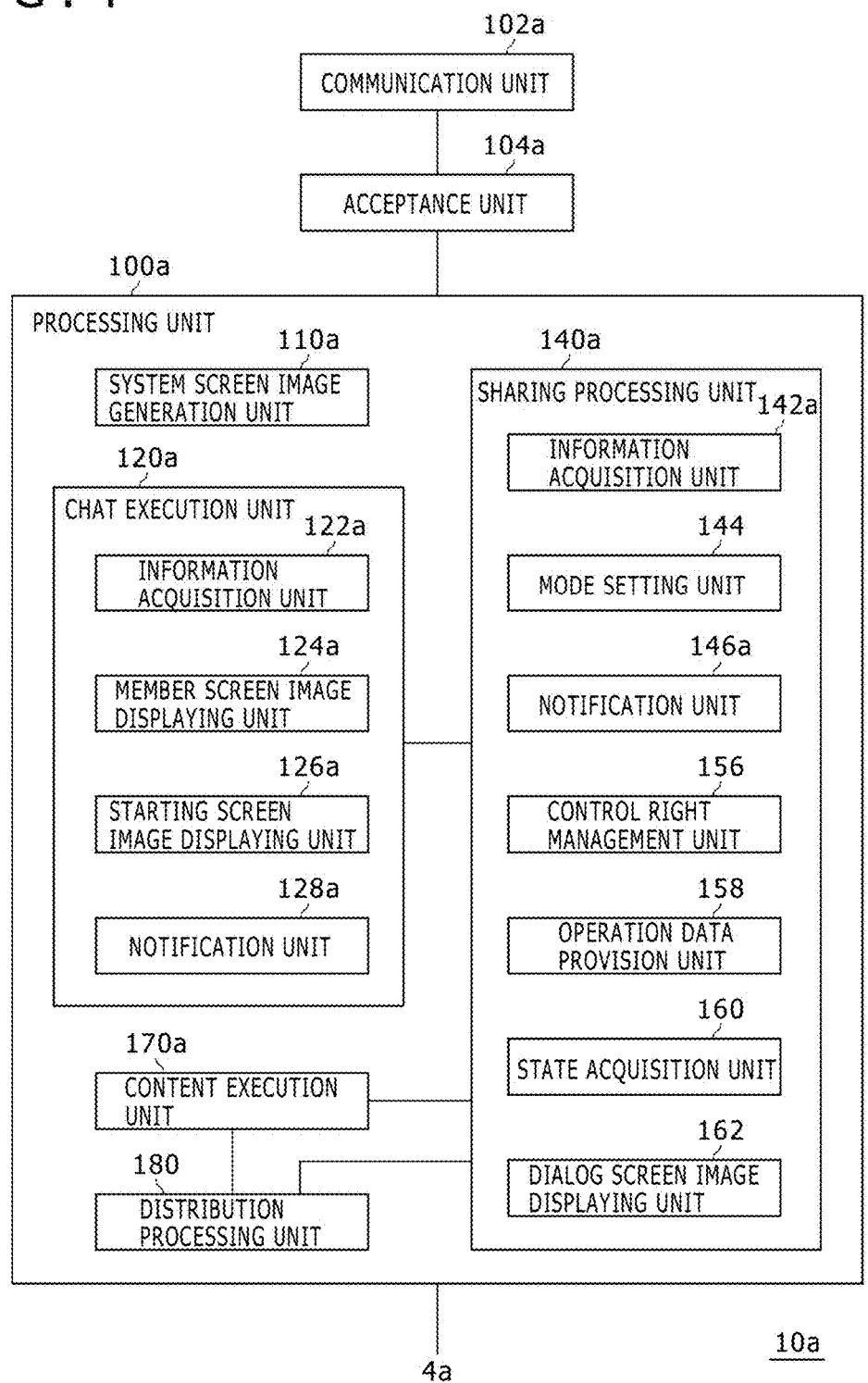
FIG. 4 is a view depicting a configuration of an information processing apparatus of a host user.

FIG. 4 depicts a configuration of the information processing apparatus 10a of the host user. The information processing apparatus 10a includes a processing unit 100a, a communication unit 102a and an acceptance unit 104a. The processing unit 100a includes a system screen image generation unit 110a, a chat execution unit 120a, a sharing processing unit 140a, a content execution unit 170a and a distribution processing unit 180. The chat execution unit 120a is implemented by a chat application and has a function for connecting to the chat application of a different user by P2P connection to transmit and receive data of voice or text. The chat execution unit 120a includes an information acquisition unit 122a, a member screen image displaying unit 124a, a starting screen image displaying unit 126a and a notification unit 128a. The sharing processing unit 140a is implemented by a share application and performs a sharing process of a content image with a different user. The sharing processing unit 140a includes an information acquisition unit 142a, a mode setting unit 144, a notification unit 146a, a control right management unit 156, an operation data provision unit 158, a state acquisition unit 160 and a dialog screen image displaying unit 162.

The acceptance unit 104a is provided between the communication unit 102a and the processing unit 100a and transmits data or information between the communication unit 102a and the processing unit 100a. It is to be noted that the communication unit 102a represents functions of the wireless communication module 38 and the wire communication module 40 depicted in FIG. 3. In the present embodiment, since the user A who acts as the host user distributes a play moving picture of a game by streaming distribution, it is described that the information processing apparatus 10a depicted in FIG. 1 has the configuration depicted in FIG. 4. However, as described hereinabove, also the other users B and C in the information processing system 1 can act each as a host user in share play, and accordingly, also the information processing apparatus 10b and 10c have the configuration depicted in FIG. 4.

Figure 5:
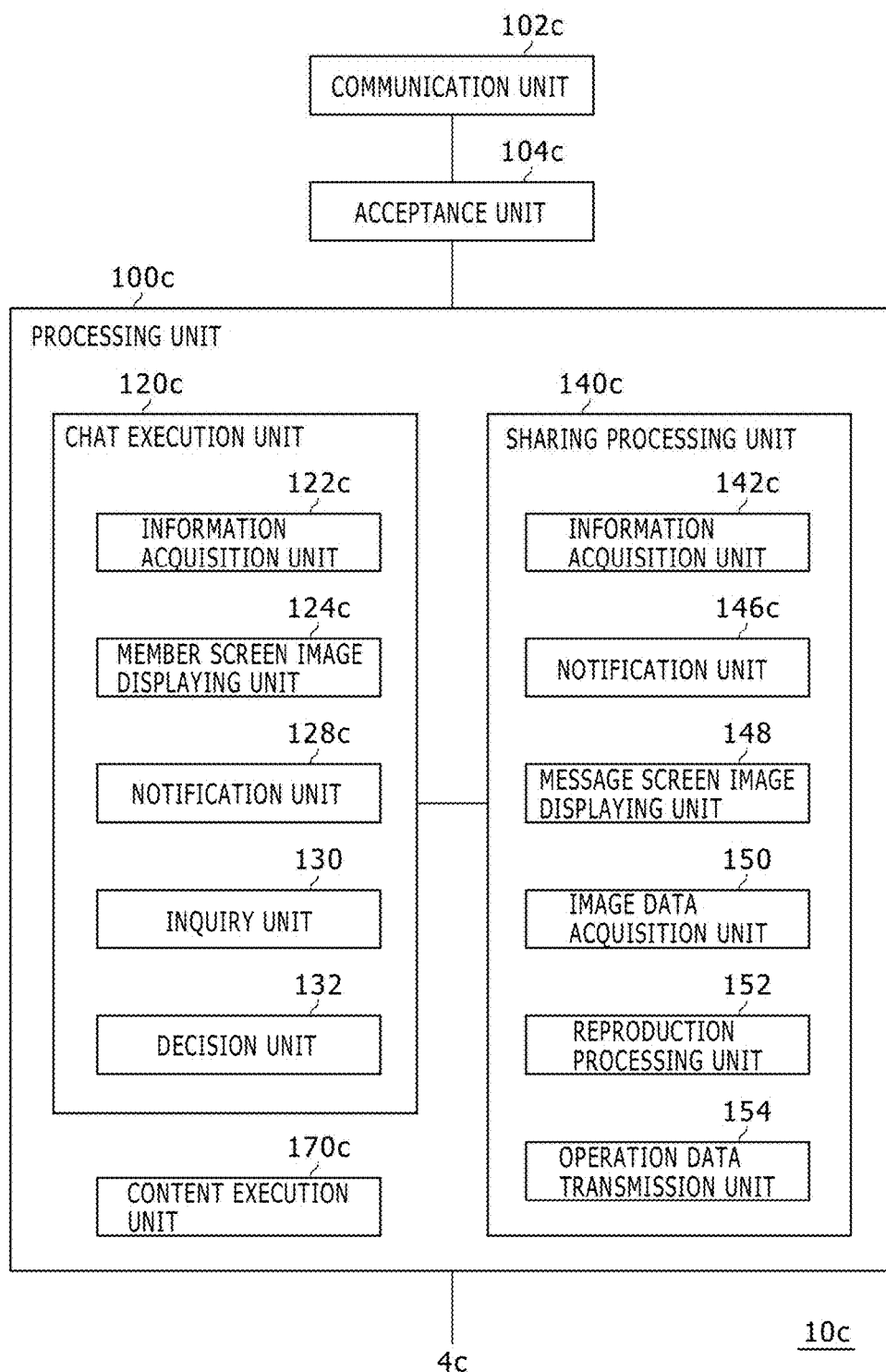
FIG. 5 is a view depicting a configuration of an information processing apparatus of a guest user.

FIG. 5 depicts a configuration of the information processing apparatus 10c of the guest user. The information processing apparatus 10c includes a processing unit 100c, a communication unit 102c and an acceptance unit 104c. The processing unit 100c includes a chat execution unit 120c, a sharing processing unit 140c and a content execution unit 170c. The chat execution unit 120c is implemented by the chat application and has a function for connecting to the chat application of a different user by P2P connection to transmit and receive data of voice or text. The chat execution unit 120c includes an information acquisition unit 122c, a member screen image displaying unit 124c, a notification unit 128c, an inquiry unit 130 and a decision unit 132. The sharing processing unit 140c is implemented by the share application and performs a sharing process of a content image with a different user. The sharing processing unit 140c includes an information acquisition unit 142c, a notification unit 146c, a message screen image displaying unit 148, an image data acquisition unit 150, a reproduction processing unit 152 and an operation data transmission unit 154.

The acceptance unit 104c is provided between the communication unit 102c and the processing unit 100c and transmits data or information between the communication unit 102c and the processing unit 100c. It is to be noted that the communication unit 102c represents the functions of the wireless communication module 38 and the wire communication module 40 depicted in FIG. 3. In the present embodiment, since the user C performs share play with the user A, it is described that the information processing apparatus 10c in FIG. 1 has the configuration depicted in FIG. 5. However, in the information processing system 1, also the other users A and C can act each as a guest user in the share play as described hereinabove, and accordingly, also the information processing apparatus 10a and 10b have the configuration depicted in FIG. 5.

The components described as functional blocks which perform various processes in FIGS. 4 and 5 are configured, in hardware, from circuit blocks, memories and other LSIs and are implemented, in software, by a program loaded in a memory and so forth. Accordingly, it is recognized by those skilled in the art that the functional blocks can be implemented in various forms from only hardware, only software or a combination of them and are not restricted to any of them. In the following, the functions for implementing share play are described.

First, in the present embodiment, in order for the host user and the guest user to carry out share play, it is necessary for both of them to participate in the same chat room. It is to be noted that an establishing person of a chat room may be any user, and any user other than the host user and the guest user may establish a chat room. In the following, a mechanism in which the user A participates in a chat room is described on the basis of the configuration depicted in FIG. 4. It is to be noted that also a different user can participate in a chat room by a similar procedure.

If the user A logs in to the information processing apparatus 10a, then the system screen image generation unit 110a generates a home screen image for the user A and displays the home screen image on the outputting apparatus 4a.

Figure 6:
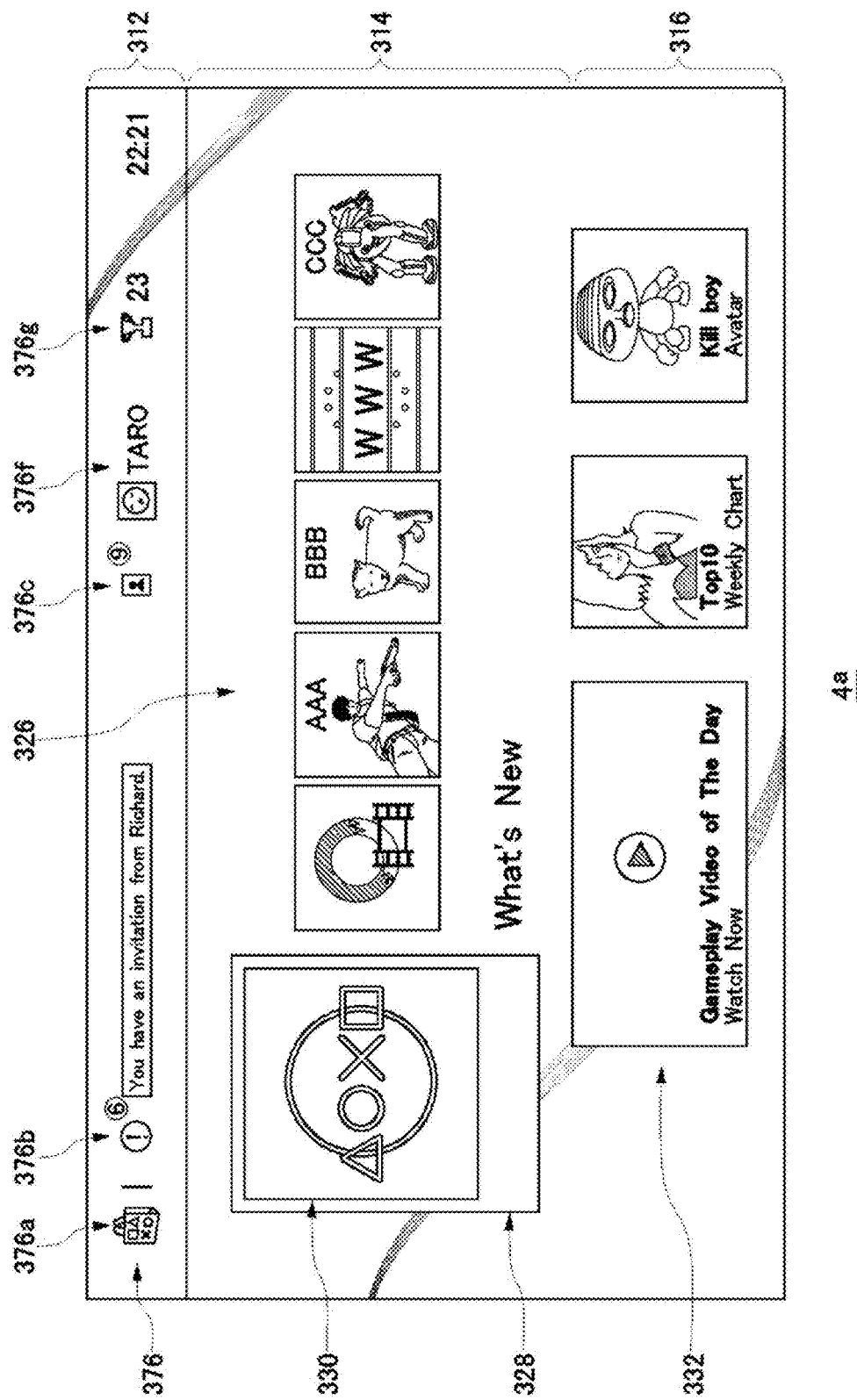
FIG. 6 is a view depicting an example of a home screen image.

FIG. 6 depicts an example of the home screen image. The system screen image generation unit 110a places a new arrival information icon 330 at the top (namely, at the left end) of an icon row. When the system screen image generation unit 110a displays the home screen image first, it places, in a content area 314, the new arrival information icon 330 into a focus frame 328 to put the new arrival information icon 330 into a focused state. The system screen image generation unit 110a places content icons 326 in a juxtaposed relationship in the icon row and places a live information item 332 into a live area 316.

Further, the system screen image generation unit 110a places part of a plurality of function icons 376, which indicate a plurality of system functions provided by the information processing apparatus 10, into a system area 312. In the example of FIG. 6, a store icon 376a, a notification icon 376b, a friend icon 376c, a profile icon 376f and a trophy icon 376g are displayed. It is to be noted that the profile icon 376f is a GUI (Graphical User Interface) for causing a profile of the user A (TARO) to be displayed.

The system screen image generation unit 110a places an on-line number indicator, which indicates an on-line friend user number, namely, the number of friends (in FIG. 6, "9") who are logged in other information processing apparatus 10 at present, in an associated relationship with the friend icon 376c. In the information processing system 1, a friend user is a user who is registered as a friend of the user A in the management server 5. Further, the system screen image generation unit 110a places an unread number indicator, which indicates the number of pieces of information unread by the user (in FIG. 6, "6"), in an associated relationship with the notification icon 376b.

If the user A places, in the home screen image, a content icon 326 of a game to be played on the focus frame 328 and operates a determination button, then the content execution unit 170a executes a game program. The content execution unit 170a performs an arithmetic operation process for moving a game character in a virtual space on the basis of operation information inputted to the inputting apparatus 6 by the user A. The content execution unit 170a includes a GPU (Graphics Processing Unit) which executes a rendering process and so forth, and receives a result of processing of the game program and generates image data of the game to be displayed on the outputting apparatus 4a. In the present embodiment, the content execution unit 170a executes a program of the game title "WARSHIP2" and the user A would play "WARSHIP2" by itself. Thereafter, the user A would return to the home screen image and activate the chat application.

If the user A returns from the game screen image of "WARSHIP2" to the home screen image and then operates the upward key of the inputting apparatus 6, then the system screen image generation unit 110a generates and displays a function screen image on the outputting apparatus 4a.

Figure 7:
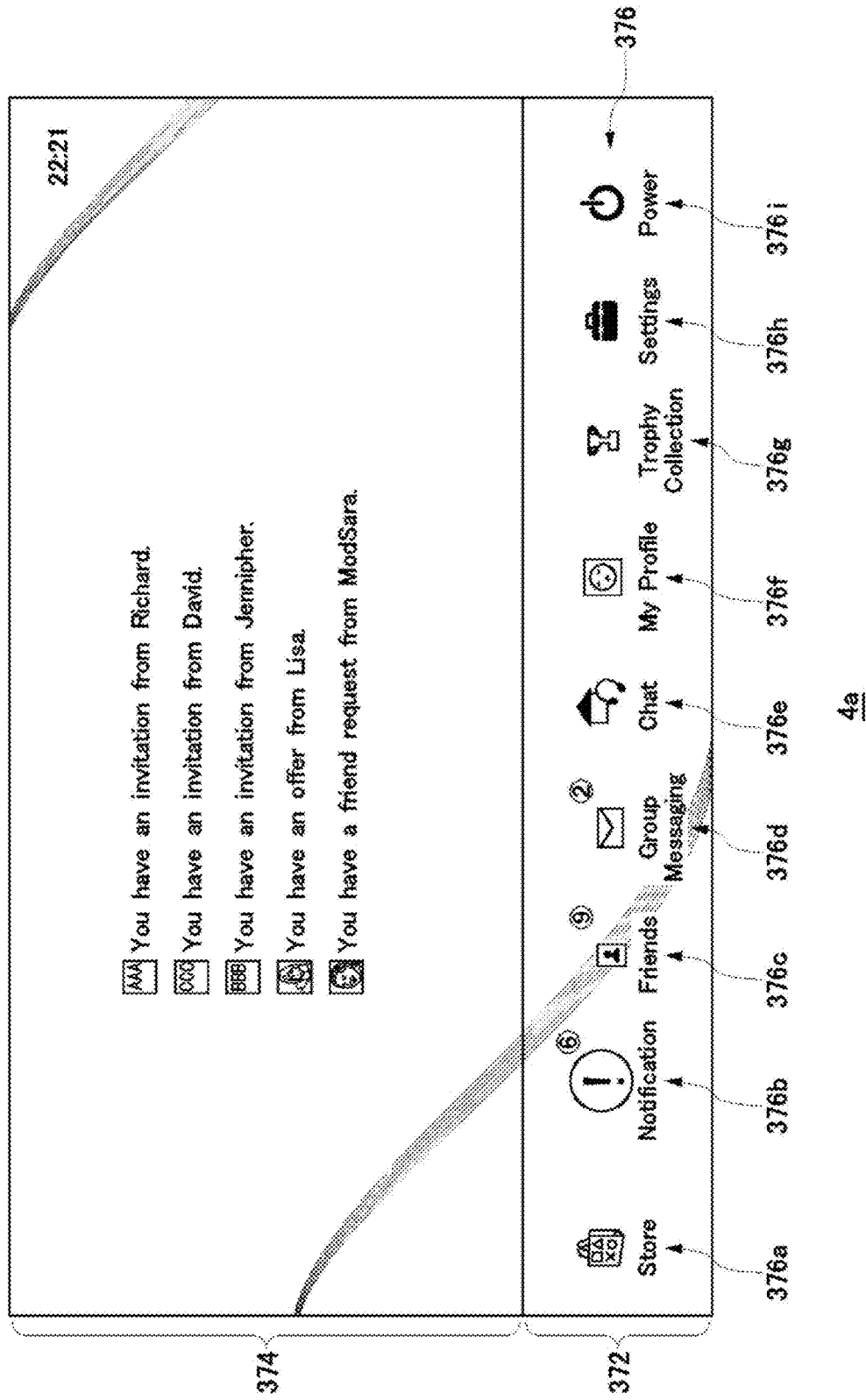
FIG. 7 is a view depicting an example of a function screen image changed from the home screen image.

FIG. 7 depicts an example of a function screen image changed over from the home screen image. The system screen image generation unit 110a places a plurality of function icons 376 in a juxtaposed relationship with each other into a system function selection area 372. Here, a store icon 376a, a notification icon 376b, a friend icon 376c, a group message icon 376d, a chat icon 376e, a profile icon 376f, a trophy icon 376g, a setting icon 376h and a power supply icon 376i are displayed. The system screen image generation unit 110a successively changes over the function icon 376 to be focused in response to an operation input of a horizontal direction of the inputting apparatus 6 by the user A and displays the focused icon in an emphasized mode (in a larger size, in a different color or the like). In FIG. 7, the notification icon 376b is selected and focused and is in a state in which it is emphasized from the other icons, and information to be displayed when the notification icon 376b is selected is depicted in a preview area 374. The user A would select the chat icon 376e from within the system function selection area 372 in order to establish a chat room or to participate in a chat room.

Figure 8:
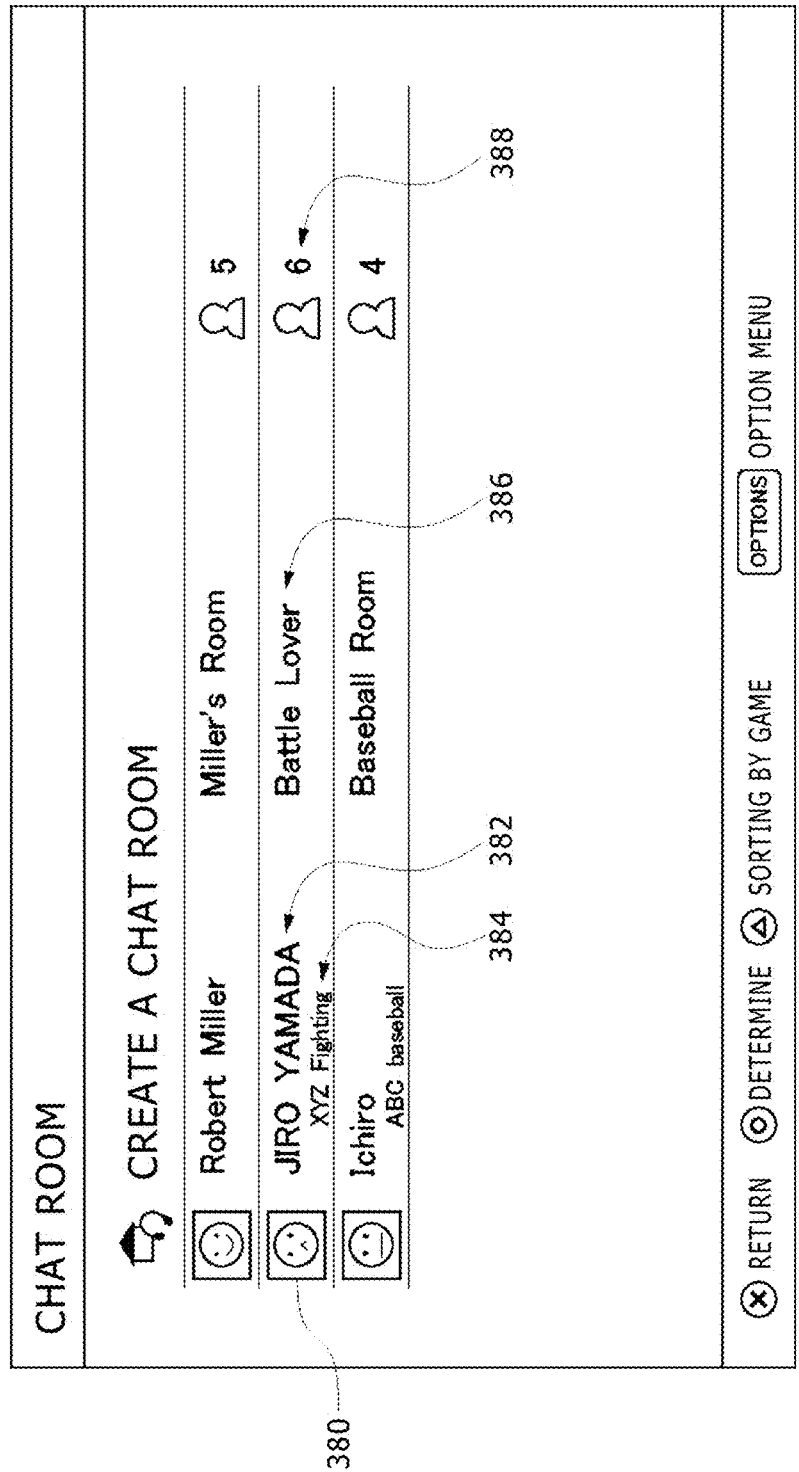
FIG. 8 is a view depicting an example of an entry screen image into a chat room.

FIG. 8 depicts an example of a room entry screen image into a chat room. If the user A selects the chat icon 376e, then the system screen image generation unit 110a generates a room entry screen image. In the room entry screen image, a choice by which the user itself generates a chat room and another choice by which the user participates in a chat room existing already are displayed. In the room entry screen image, the choice "CREATE A CHAT ROOM" is displayed at the top stage, and information of three existing chat rooms is displayed below the top stage. It is to be noted that, if no existing chat room is available, then no choice for a chat room is displayed.

The second existing chat room from above is described. An owner icon 380 is an icon of an owner by whom the chat room is established, and an owner name 382 is a user name of the owner. A game title 384 is a game title name being played at present by the owner, and if the owner is playing no game, then the field is displayed blank. A room name 386 is a name of the chat room established by the owner, and it is indicated here that the chat room name is "Battle Lover" named by "JIRO YAMADA." A participant number indicator 388 indicates the number of people who participates in the chat room.

The user A can select, on the room entry screen image, whether the user A itself is to create a chat room or participate in one of the chat rooms. Here, the user A would select and enter "Battle Lover" established by "JIRO YAMADA." When the user A participates in the chat room, the communication unit 102a acquires address information of members of the chat room the user A has entered and establishes connection to the information processing apparatus 10 of all of the members by P2P connection.

The functions of the chat execution unit 120a are implemented by the chat application. The information acquisition unit 122a acquires user information of the room members, in particular, the user name and the user icon of each member, a game title and a game icon of the game being played and information of a chat situation and so forth, from the information processing apparatus 10 of each room member. The member screen image displaying unit 124a generates a member screen image of the chat room on the basis of the user information acquired by the information acquisition unit 122a and displays the member screen image on the outputting apparatus 4a.

Figure 9:
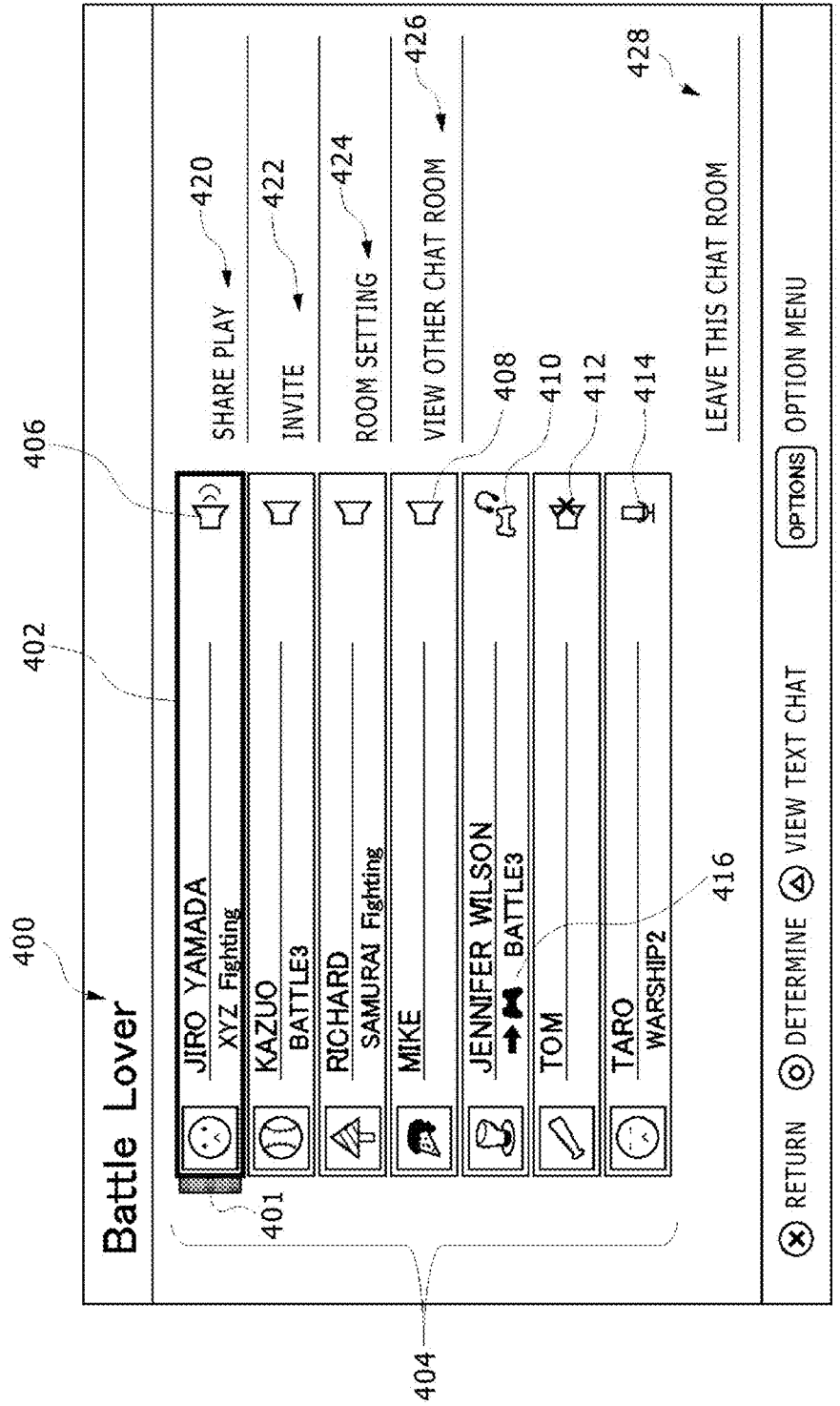
FIG. 9 is a view depicting an example of a member screen image of a chat room.

FIG. 9 depicts an example of a member screen image of a chat room. At the top stage of the member screen image, a room name 400 is displayed. The member screen image displaying unit 124a displays, in a member information area 404 set on the left side in the member screen image, user information relating to the user itself and user information relating to the other members acquired by the information acquisition unit 122a. In the chat room "Battle Lover," seven users participate, and the user information of the members is displayed in a juxtaposed relationship in the form of a list. In the member information area 404, at the top stage, user information of the room owner by whom the room is established is displayed, and an owner indicator 401 indicative of the owner is added. Meanwhile, at the lowermost stage, the user information of the user A itself (namely, TARO) is displayed. Here, it is indicated that the user A is playing the game title "WARSHIP2."

Here, on the right side of each of the display fields of the user information, a situation of chat of the user is indicated by an icon. For example, a chat icon 406 indicates that the user is talking by voice chat; a chat icon 408 indicates that the user is in voice chat connection; a chat icon 410 indicates that a game image is being distributed and the voice output is active; and a chat icon 412 indicates that a microphone output of voice chat is off. Although a chat icon 414 indicates that the user is in voice chat connection, if it is compared with the chat icon 408, then it is different in that the own chat situation is represented not by a speaker but by a microphone. It is to be noted that, while "JENNIFER WILSON" is playing the game title "BATTLE3," it is indicated that the user is executing a session which allows participation and a different user can participate in the session. It is to be noted that the participation in this session is possible when the different user has "BATTLE3," and accordingly, it is to be noted that share play in which a game image is shared even if game software is not possessed is a different type of game participation.

On the right side of the member information area 404, items of functions in this chat room are displayed. A share play item 420 is an item for carrying out share play with a different user, which will be described later. An invitation item 422 is an item for inviting a different user into the chat room. A room setting item 424 is an item for adjusting, for example, a microphone level, sound mix and so forth in the chat. Further, a different room reference item 426 is an item for referring to a different chat room, and a leaving item 428 is an item for leaving the chat room.

In the member screen image, a focus frame 402 is displayed for movement, and the user A can operate the direction key 71 of the inputting apparatus 6 to select a desired item. In the example of FIG. 9, the focus frame 402 is placed in the user display region of "JIRO YAMADA" of the room owner, and if the user A operates the determination button in this state, then a profile screen image of "JIRO YAMADA" may be displayed.

In the present embodiment, the user A makes preparations for performing share play with a different user by participating in the chat room.

Figure 10:
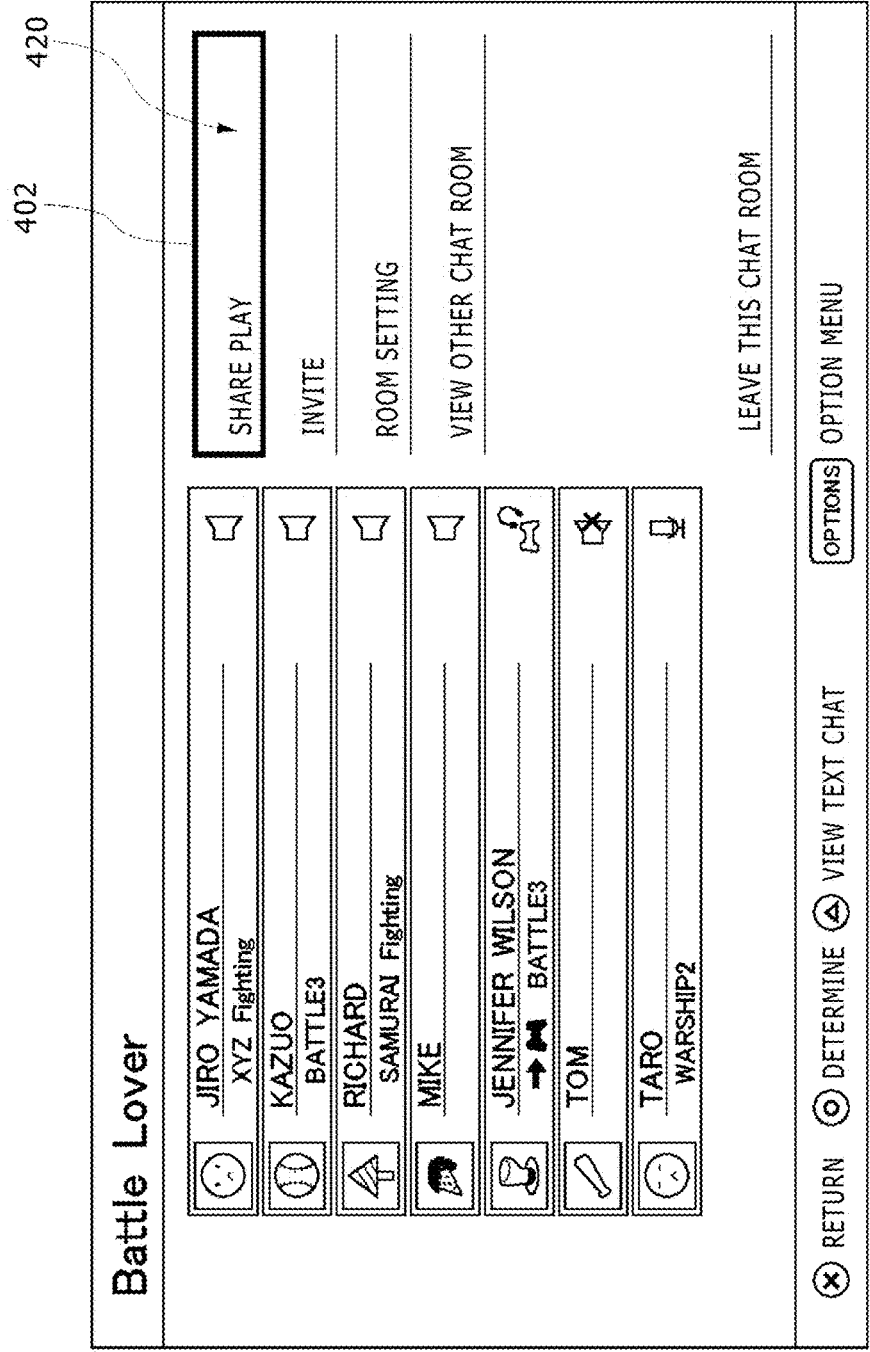
FIG. 10 is a view illustrating a state in which a focus frame is placed on a shared play item.

FIG. 10 depicts a state in which the focus frame 402 is placed on the share play item 420. If the user A operates the determination button of the inputting apparatus 6, then the user A comes to behave as the host user of share play.

Figure 11:
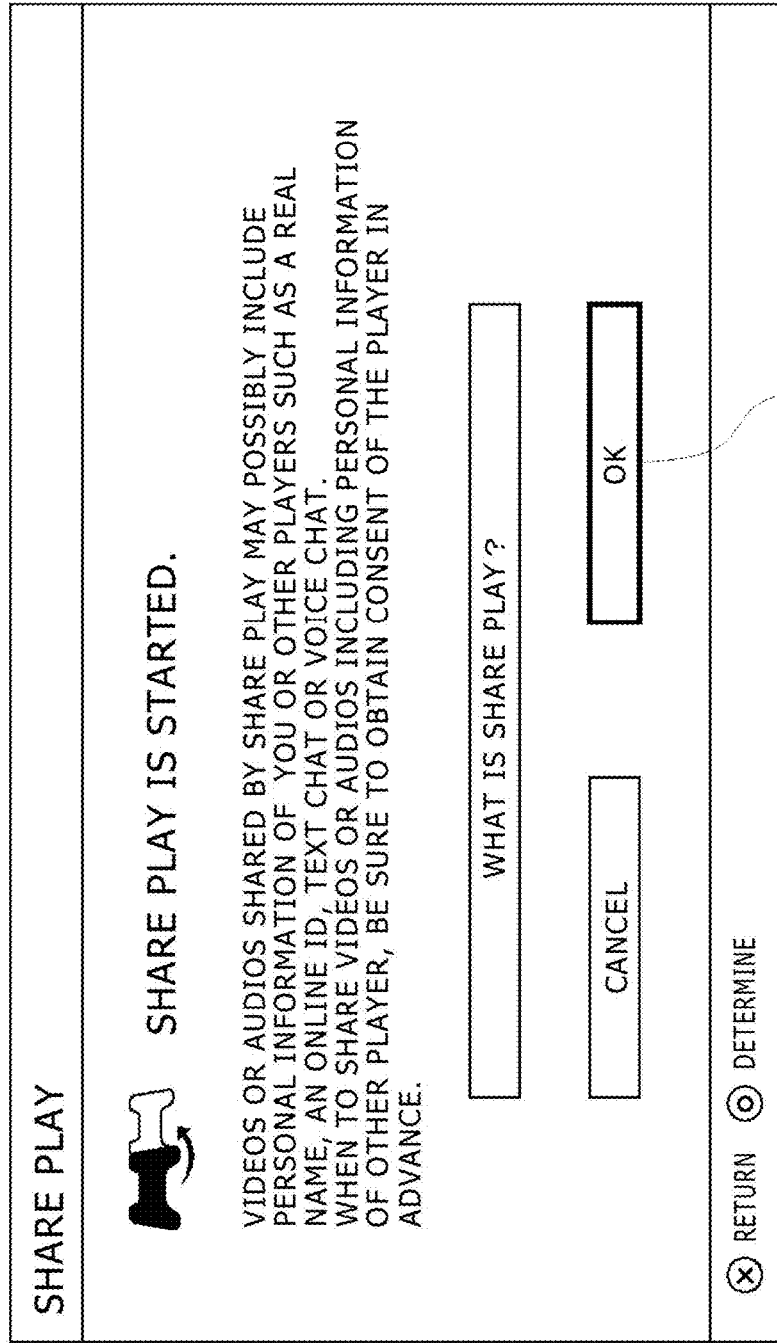
FIG. 11 is a view depicting a starting screen image of shared play.

FIG. 11 depicts a starting screen image of share play. If the user A performs a determination operation for the share play item 420 on the member screen image, then the starting screen image displaying unit 126a displays a starting screen image for share play. In the starting screen image, a note when share play is to be performed is displayed. If the user A moves a focus frame 430 to select an "OK" button, then starting conditions for share play in which the user A acts as the host user are established and a state in which participation of other users is waited is entered. At this point of time, the share application for performing a sharing process of a game image is activated to implement the functions of the sharing processing unit 140a. It is to be noted that if "WHAT IS SHARE PLAY?" is selected, then an explanation screen image of share play is displayed.

FIG. 12 depicts an explanation screen image of share play. In the explanation screen image, it is described that two users who participate in the same chat room individually can act as the host or the guest to perform share play and that the three modes described hereinabove are available as a mode of share play.

If the user A selects the "OK" button on the starting screen image of share play depicted in FIG. 11, then the member screen image displaying unit 124a displays a member screen image.

FIG. 13 depicts the member screen image. The notification unit 146a displays a starting message 432 on the member screen image in order to indicate that starting conditions of share play are satisfied. The starting message 432 may be displayed, for example, for several seconds after the display screen image changes over to the member screen image and then may be non-displayed.

The notification unit 128a notifies the members of "Battle Lover," namely, the other members who participate in the same chat room, of a message representing that the user A has started the share play. Consequently, the other members can know that the user A has started the share play. It is to be noted that the share play is not actually started before participation of other users is permitted, and accordingly, the message representing that the user A has started the share play signifies that the user A wants share play and is in a state in which the user A waits for participation of other users.

Now, processing by the information processing apparatus 10c of the user C is described with reference to FIG. 5. Here, it is assumed that the user C is a member participating in "Battle Lover" and is the user "RICHARD" in FIG. 13. As depicted by the member screen image of FIG. 13, the user C is playing "SAMURAI Fighting" by itself while performing voice chat.

Referring to FIG. 5, in the information processing apparatus 10c, the content execution unit 170c is executing the game title "SAMURAI Fighting."

Figure 14:
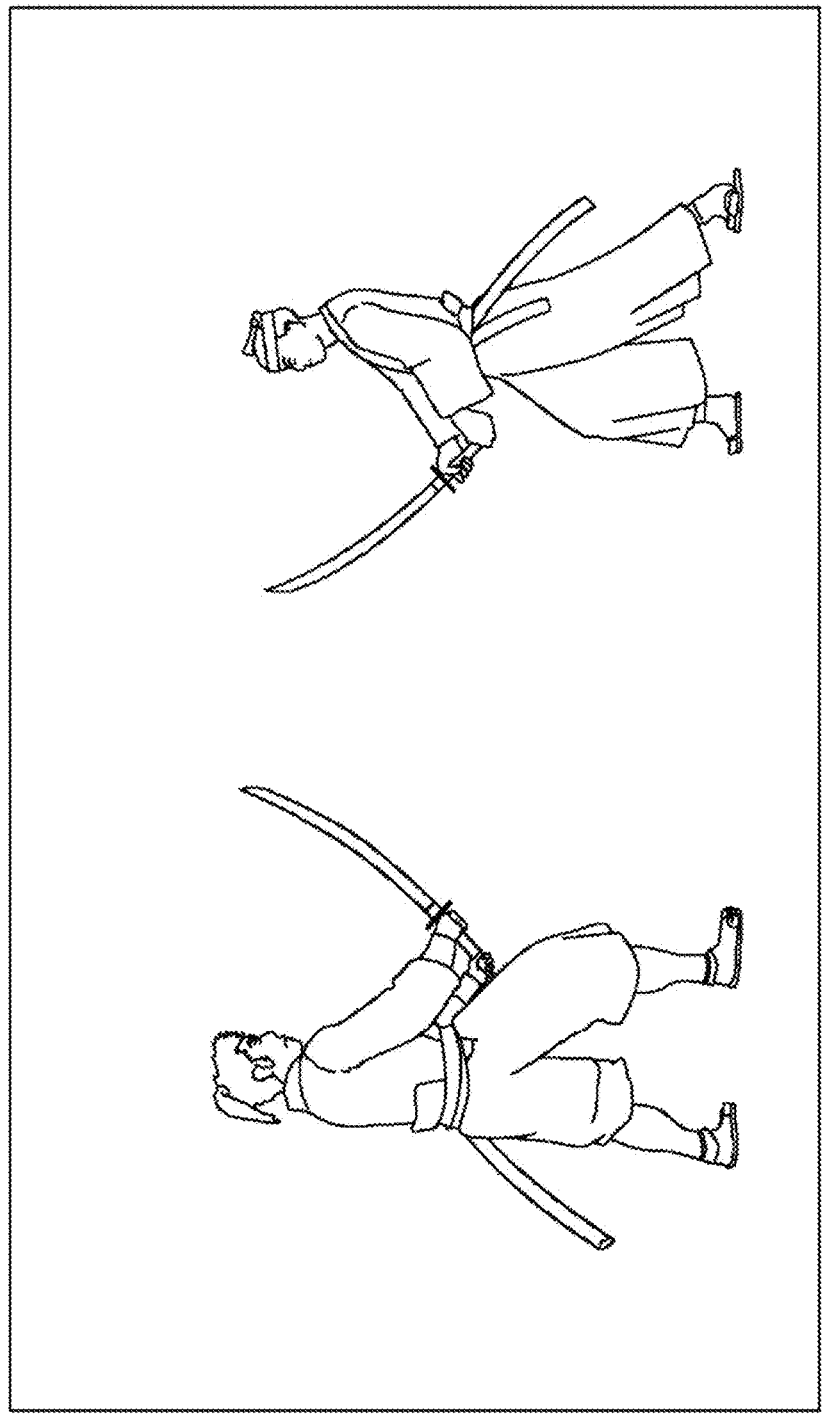
FIG. 14 is a view depicting a game screen image displayed on an outputting apparatus of a user C.

FIG. 14 depicts a game screen image displayed on the outputting apparatus 4c of the user C. The user C is enjoying the game by itself while activating the chat application. Accordingly, the user C is in a state in which, while the user C is playing "SAMURAI Fighting," the user C can perform voice chat with the other members participating in "Battle Lover."

If the user C is notified of a starting message of share play from the information processing apparatus 10a while the user C is playing a game, then the information acquisition unit 122c in the information processing apparatus 10c acquires the message conveyed thereto from the information processing apparatus 10a of the user A. The notification unit 128c displays the acquired message on the game screen image displayed on the outputting apparatus 4c.

Figure 15:
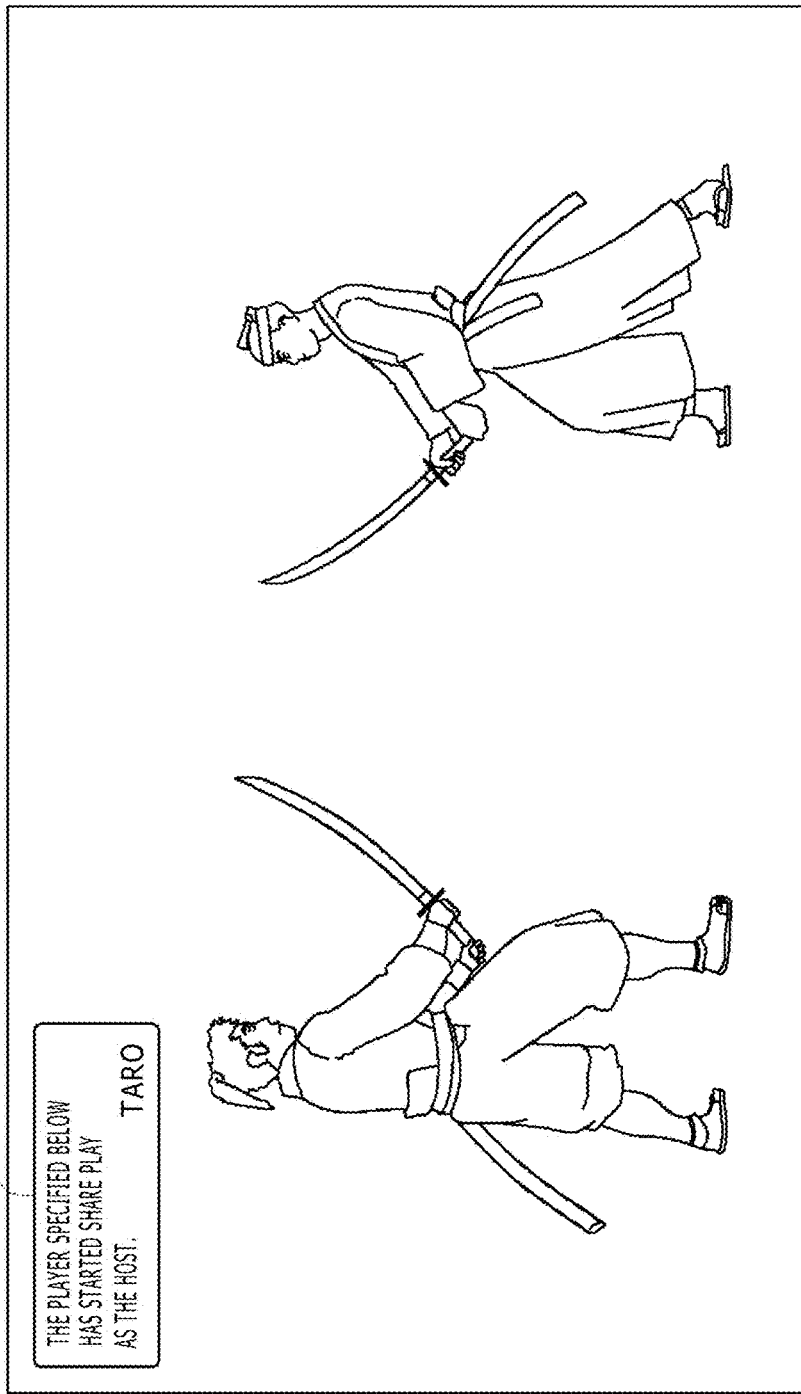
FIG. 15 is a view illustrating a starting message displayed in an overlapping relationship on the game screen image.

FIG. 15 depicts a starting message 434 displayed in an overlapping relationship on the game screen image. The notification unit 128c displays, as the starting message 434, that share play is started and the host user name of the share play. Consequently, the user C can know that "TARO" who is the user A has started share play. It is to be noted that, if the message transmitted from the information processing apparatus 10a includes the game title name being played by the user A, then the notification unit 128c may display the starting message 434 including the game title name being played by the user A. The notification unit 128c displays the starting message 434 for a predetermined period of time, for example, for approximately ten seconds. It is to be noted that, if the user C is viewing a display screen image such as the home screen image generated by the system screen image generation unit, then the notification unit 128c displays the starting message 434 in an overlapping relationship on the display screen image.

Although it is described here that the starting message 434 is displayed in an overlapping relationship on the screen image of the outputting apparatus 4c which is used by the user C, the starting message 434 is displayed in an overlapping relationship not only on the screen image of the outputting apparatus 4c of the user C but also on the screen image of the outputting apparatus 4 of the other members than the user A of "Battle Lover." As described hereinabove, at the point of time at which the starting message 434 is displayed, the user A (TARO) is in a state in which it waits for starting of share play, and the starting message 434 is recognized as a message for the notification that participation in the share play is permitted. Here, the participation in the share play is implemented by a participation request transmitted from a member to and accepted by the information processing apparatus 10a of the user A. In other words, a member can participate in the share play, in a sense, in a first come, first served fashion.

If the user C operates a predetermined button of the inputting apparatus 6, then the information acquisition unit 122c acquires user information of the room members, namely, user information such as the user name and the user icon of each member, the game title and the game icon of the game being played, and a chat situation. Then, the member screen image displaying unit 124c generates a member screen image of the chat room on the basis of the user information acquired by the information acquisition unit 122c and displays the member screen image on the outputting apparatus 4c.

Figure 16:
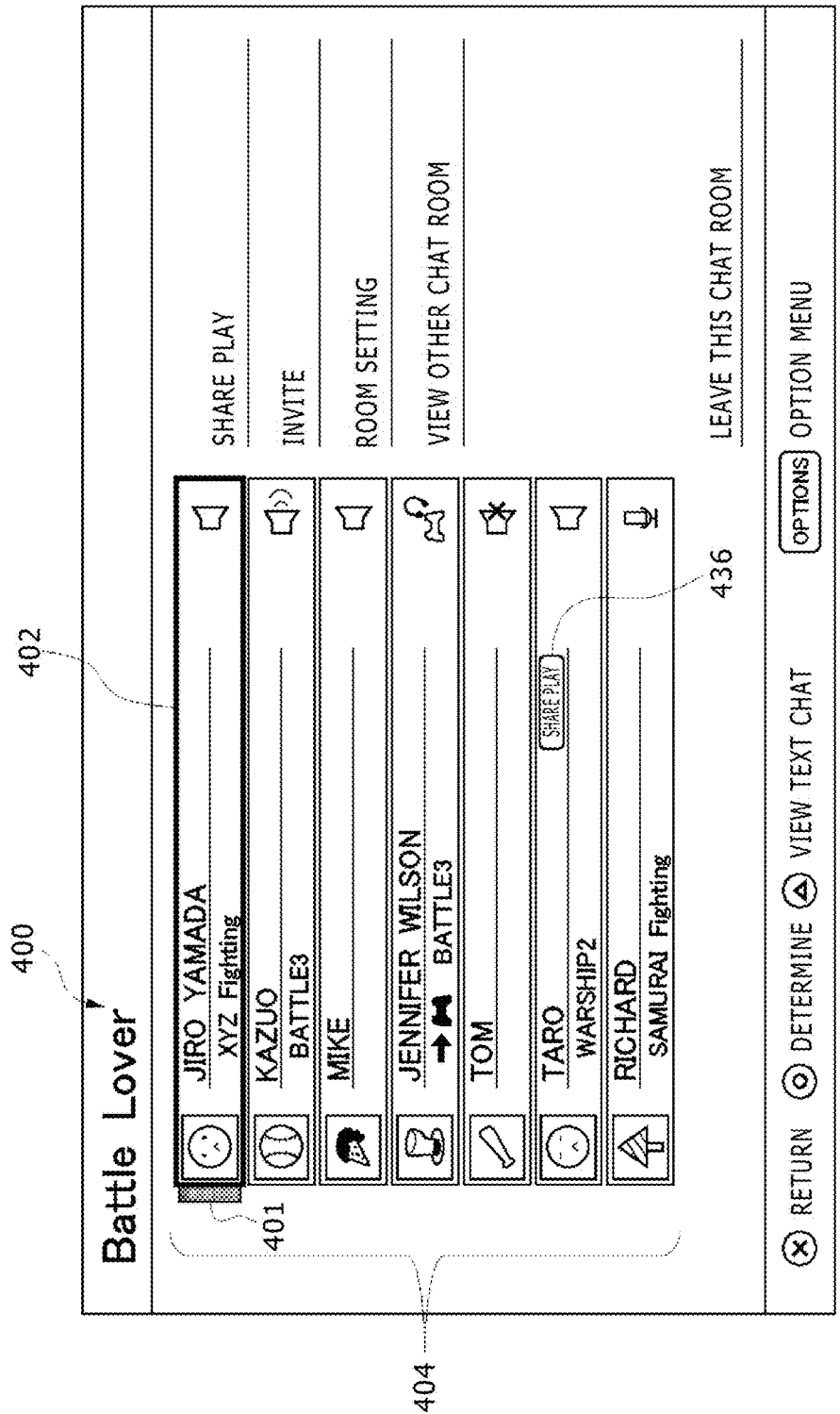
FIG. 16 is a view depicting an example of a member screen image of a chat room.

FIG. 16 depicts an example of the member screen image of a chat room. At the top stage of the member screen image, the room name 400 is displayed. The member screen image displaying unit 124c displays, in the member information area 404 set to the left side in the member screen image, user information regarding the other members acquired by the information acquisition unit 122c in the form of a list together in a juxtaposed relationship with the own user information. In the member information area 404, at the uppermost stage, the user information of the room owner by whom the room has been established is displayed, and the owner indicator 401 indicating the owner is added. Meanwhile, at the lowermost stage, the information of the user C itself (namely, RICHARD) is displayed.

In the user information displaying field of the user A, a share play indicator 436 indicating that share play is possible is displayed. By confirming the share play indicator 436, the user C recognizes that "TARO" who is the user A is in a state in which it can perform share play.

Figure 17:
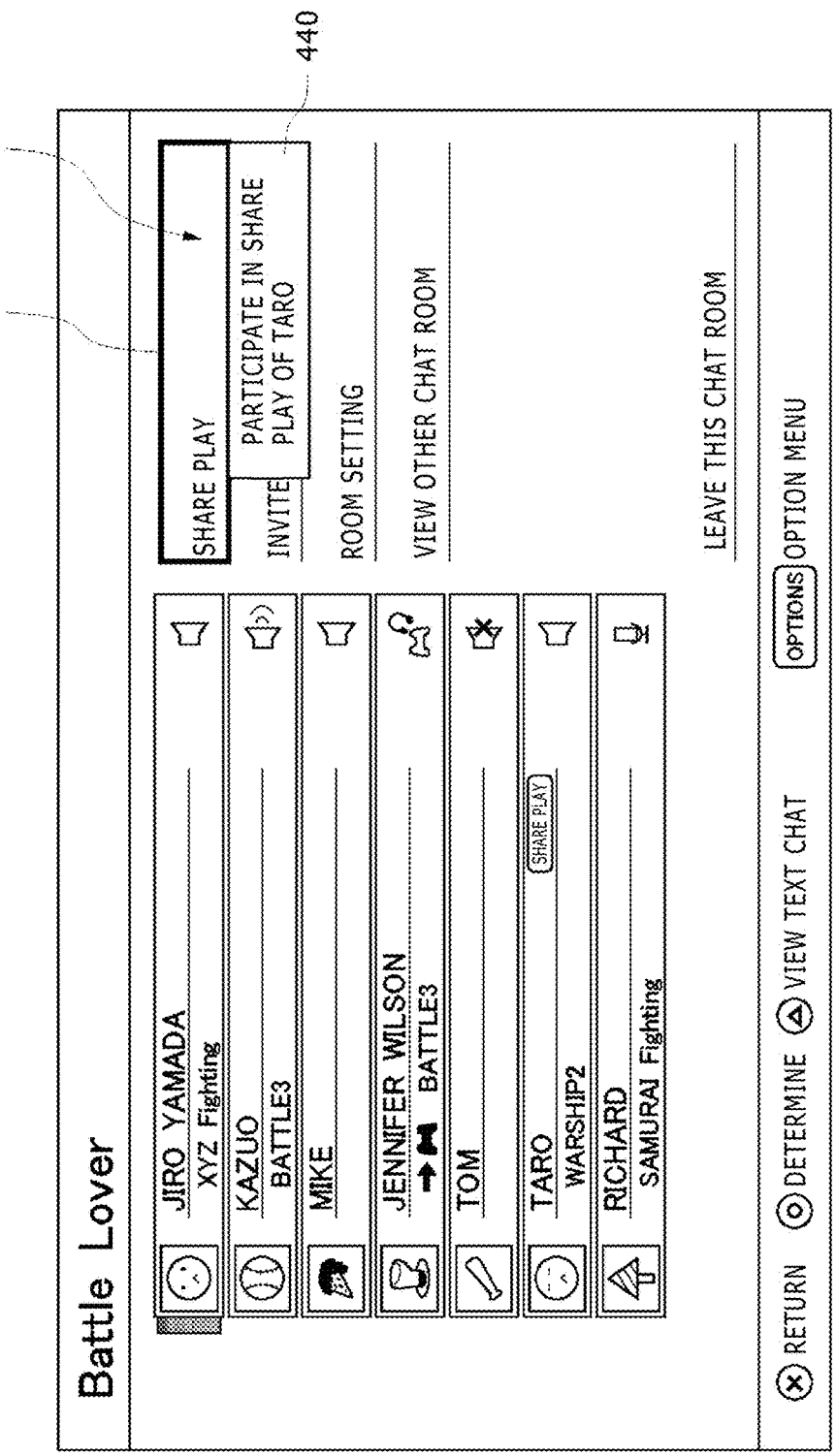
FIG. 17 is a view depicting a selection item displayed when a determination operation is performed with the focus frame placed on the shared play item.

FIG. 17 depicts a selection item displayed when a determination operation is performed with the focus frame 402 placed on the share play item 420. The selection item is a participation GUI (Graphical User Interface) 440 for selecting to participate in share play. If the user C places the focus frame 402 on the participation GUI 440 and operates the determination button, then the notification unit 128c transmits a participation request to the information processing apparatus 10a to propose participation in the share play of the user A.

Figure 18:
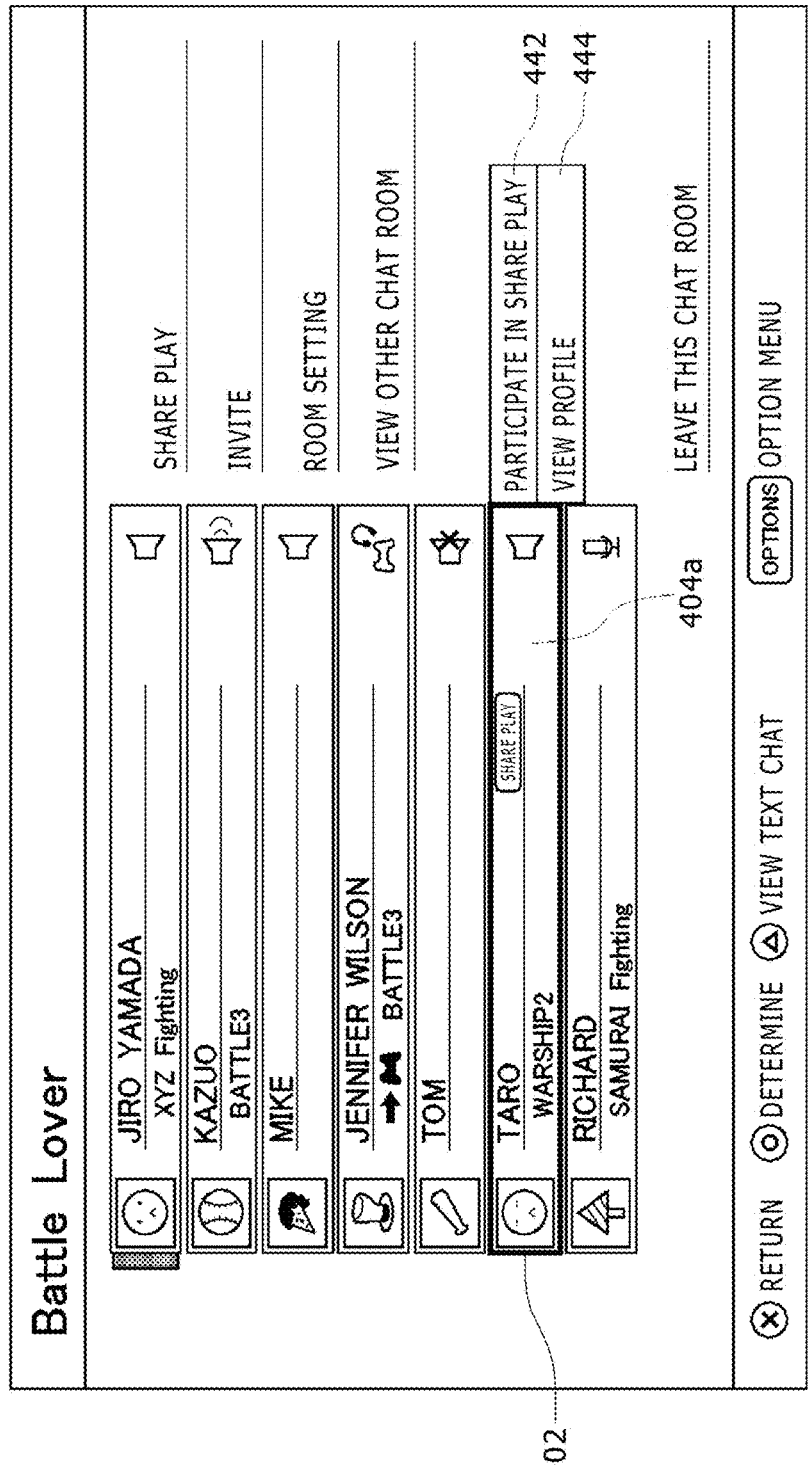
FIG. 18 is a view illustrating a selection item displayed when a determination operation is performed with the focus frame placed in an information display field of a user A.

FIG. 18 depicts a selection item displayed when the determination operation is performed with the focus frame 402 placed on an information displaying field 404a of the user A. This selection item includes a participation GUI 442 for selecting participation in the share play and a profile GUI 444 for selecting browsing of the profile of "TARO." If the user C places the focus frame 402 on the participation GUI 442 and operates the determination button, then the notification unit 128c transmits a participation request to the information processing apparatus 10a to propose participation in the share play of the user A.

Here, as depicted in FIG. 1, the user A is managed by the management server 5a in the country X while the user C is managed by the management server 5b in the country Y. In other words, the user C is controlled to behave in accordance with management criteria different from those of the user A. Whether or not the user C is permitted to participate in the share play of the user A is determined on the basis of situations of the management server 5b.

The information processing apparatus 10c of the user C determines whether or not the user C is permitted to participate in the share play on the basis of the information from the management server 5b. It is to be noted that, when the parental function in the information processing apparatus 10c is on, a parental control level value (hereinafter referred to as "PCT value") of a game which can be played by the user C is set in the information processing apparatus 10c. A PCL value is set also to a game title, and if the PCL value set to the user C is lower than the PCL value of the game title, then the user C cannot play the game.

Figure 19:
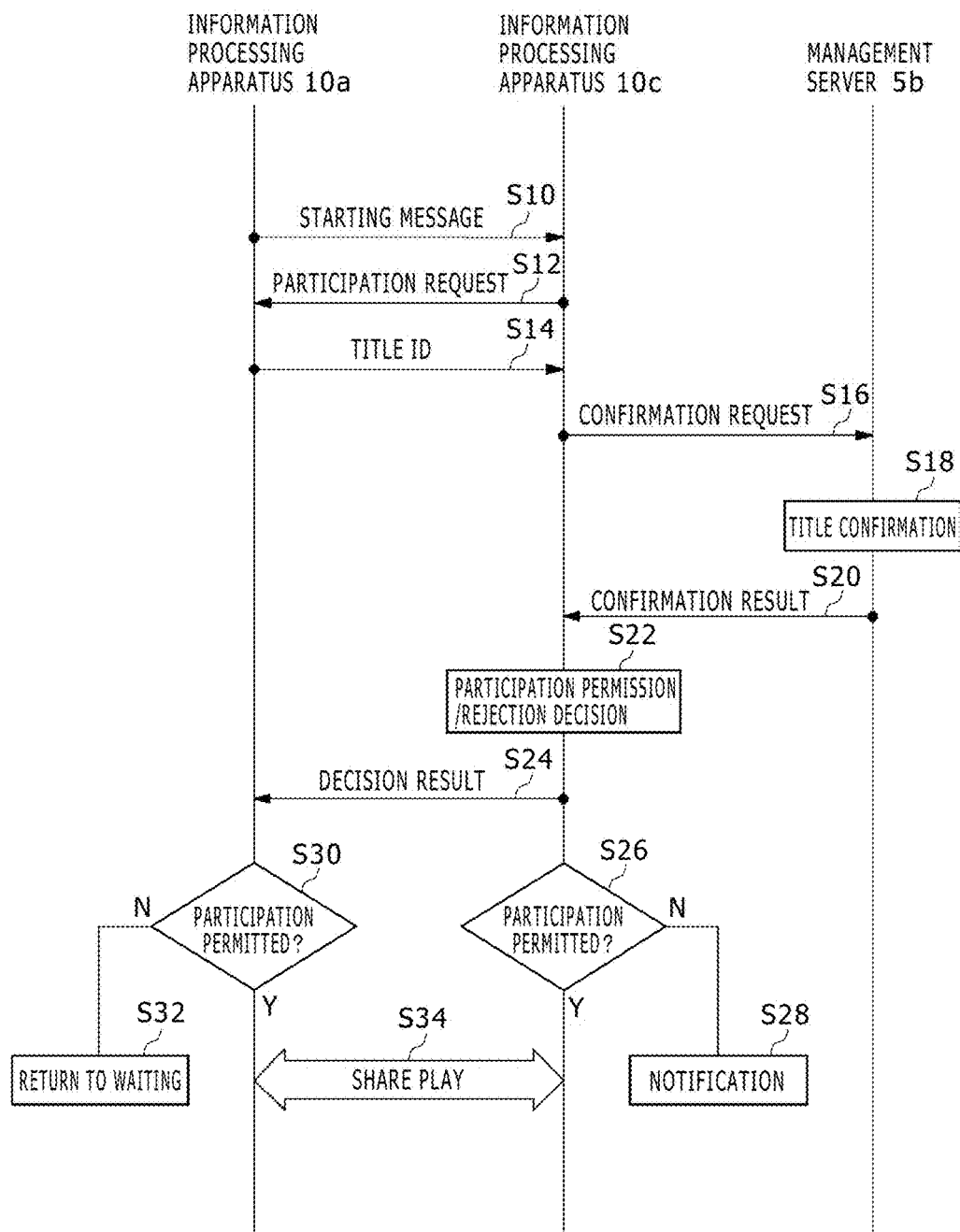
FIG. 19 is a flow chart for deciding whether or not the user C can participate in shared play of the user A.

FIG. 19 is a flow chart for deciding whether or not the user C is permitted to participate in the share play of the user A. In the information processing apparatus 10a, the notification unit 128a notifies all of the members of the chat room that share play is to be started (S10). It is to be noted here that to start share play signifies that participation in the share play is accepted, and in short, the notification unit 128a notifies the other members that starting conditions for the share play are satisfied. The information processing apparatus 10a then waits for a participation request from a different member.

In the information processing apparatus 10c of the user C, the information acquisition unit 122c acquires a starting message. The starting message is displayed in an overlapping relationship on the screen image of the outputting apparatus 4c (refer to FIG. 15), and, for example, if the user C selects the participation GUI indicative of participation in the share play from within a member screen image, then the notification unit 128c transmits a participation request to the information processing apparatus 10a (S12). The information processing apparatus 10a accepts the participation request transmitted first from among the chat members and transmits information for specifying a content being played (title ID of the game) to the information processing apparatus 10c (S14).

In the information processing apparatus 10c, the inquiry unit 130 transmits the title ID to the management server 5b and requests the management server 5b for a confirmation work of the content (S16). Here, the substance for requesting the confirmation is whether or not the management server 5b first places the game title specified by the title ID in a downloadable state, and in short, whether or not the management server 5b provides the game title to a user by sales or the like. If the management server 5b does not sell the game title specified by the title ID, then the management server 5b transmits it to the information processing apparatus 10c that the game title is not sold (S20). On the other hand, if the management server 5b sells the game title, then the management server 5b transmits the PCL value set to the game title and age information indicative of an age by which the game title can be purchased to the information processing apparatus 10c (S20).

In the information processing apparatus 10c, the decision unit 132 utilizes the game title ID to determine whether or not provision of a game image from the information processing apparatus 10a may be accepted. In particular, the decision unit 132 receives a result of confirmation from the management server 5b utilizing the game title ID and decides whether or not the user C is permissible to participate in the share play (S22).

Figure 20:
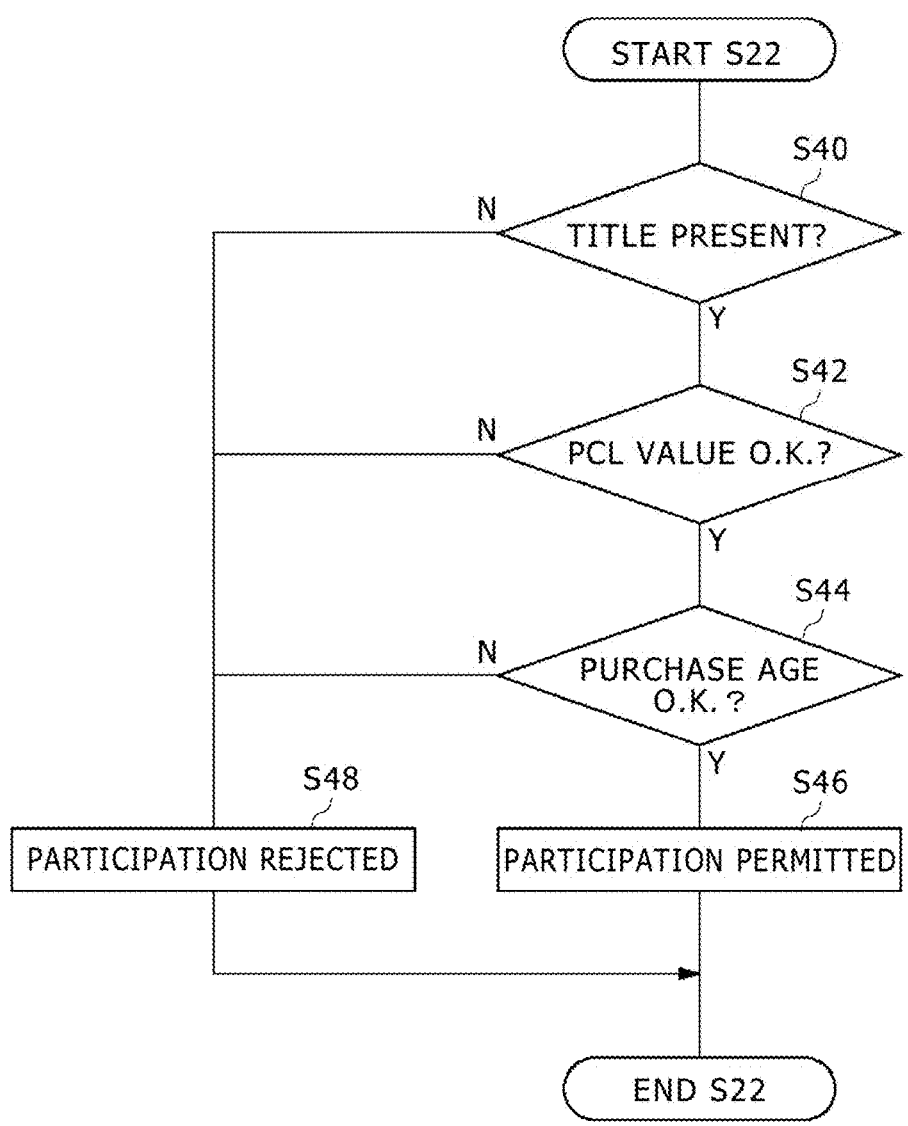
FIG. 20 is a flow chart of a decision process at S22.

FIG. 20 is a flow chart of the decision process at S22. First, if the decision unit 132 confirms from a result of the confirmation that the game title is not sold (N at S40), then the decision unit 132 decides that the user C is not permitted to participate in the share play (S48). For example, while, in the country X in which the user A lives, the game title (in this case, "WARSHIP2" which is being played by the user A) is sold and the user A can purchase and play "WARSHIP2," in the country Y in which the user C lives, this "WARSHIP2" may not be sold. In such a case, if it is assumed that the user C is permitted to participate in the share play and play this game, then this results in lack of fairness with the other users who live in the country Y and is not preferable. Therefore, if the game title is not sold and cannot be acquired from the management server 5b, then the decision unit 132 decides that the user C is not permitted to participate in the share play.

On the other hand, if the game title is sold (Y at S40), then the decision unit 132 compares the PCL (Parental Control Level) value set to the information processing apparatus 10c and the PCL value set to the game title with each other (S42). At this time, if the PCL value set to the information processing apparatus 10c is lower than the PCL value of the game title (N at S42), then the decision unit 132 decides by the parental control function thereof that it is not appropriate that the user C participates in the share play and decides that the user C is not permitted to participate in the share play (S48).

On the other hand, if the PCL value set to the information processing apparatus 10c is equal to or higher than the PCL value of the game title (Y at S42), then the decision unit 132 checks whether or not the age of the user C is equal to or higher than the age by which the game title is permitted to be purchased (S44). If the age of the user C does not reach the age by which the game title is permitted to be purchased (N at S44), then the decision unit 132 decides that the user C is not permitted to participate in the share play (S48). It is to be noted that the age of the user C is recorded as registration information of the user C in the information processing apparatus 10c. On the other hand, if the age of the user C reaches the age by which the game title is permitted to be purchased (Y at S44), then the decision unit 132 decides that the user C is permitted to participate in the share play (S46).

Referring back to FIG. 19, after the decision unit 132 decides whether or not participation of the user C is permitted (S22), the notification unit 128c transmits the result of the decision to the information processing apparatus 10a (S24). It is to be noted that, if the decision result indicates that the participation is not permitted (N at S26), then the notification unit 128c in the information processing apparatus 10c displays the notification that the user C is not permitted to participate in the share play of the user A on the outputting apparatus 4c (S28). It is to be noted that, at this time, the notification unit 128c may indicate by what reason the participation is not permitted. On the other hand, if the decision result indicates that the participation is permitted (Y at S26), then at this point of time, the share application for performing a sharing process of a game image is activated in the information processing apparatus 10c to implement the functions of the sharing processing unit 140c which performs a sharing process of a game image.

In the information processing apparatus 10a, the information acquisition unit 122a acquires the decision result transmitted thereto from the information processing apparatus 10c, and if the decision result indicates rejection of the participation (N at S30), then the information processing apparatus 10a returns to a waiting state and makes preparations for acceptance of a participation request from a different user. On the other hand, if the decision result indicates permission of the participation, namely, if the decision result indicates that the information processing apparatus 10c can receive provision of a game image (Y at S30), then share play is started between the information processing apparatus 10a and the information processing apparatus 10c (S34), and a game image is distributed from the information processing apparatus 10a to the information processing apparatus 10c.

Where the information processing apparatus 10a and the information processing apparatus 10c are placed in different countries (regions) from each other and can acquire a content from the management servers 5a and 5b different from each other in this manner, preferably it is determined whether or not participation in share play is permitted taking a sales situation of the game title at least in the guest user country into consideration.

The user A and the user C start share play in such a manner as described above. It is to be noted that, while, in the example described above, the user A and the user C are managed by the management servers 5 in different regions from each other, if they are managed by the same management server 5, then since the sales situations of the game title are same as each other, S40 in FIG. 20 may be omitted to decide whether or not participation of the user C is permitted.

Further, whether or not share play can be executed may otherwise be decided simply depending upon a country in which a user lives. For example, if a country Z sets the management criteria for users (viewing age limit and so forth) very strictly, then although a user in the country Z can act as the host, the user may not be able to participate in share play in which a user in a different country acts as the host.

Figure 21:
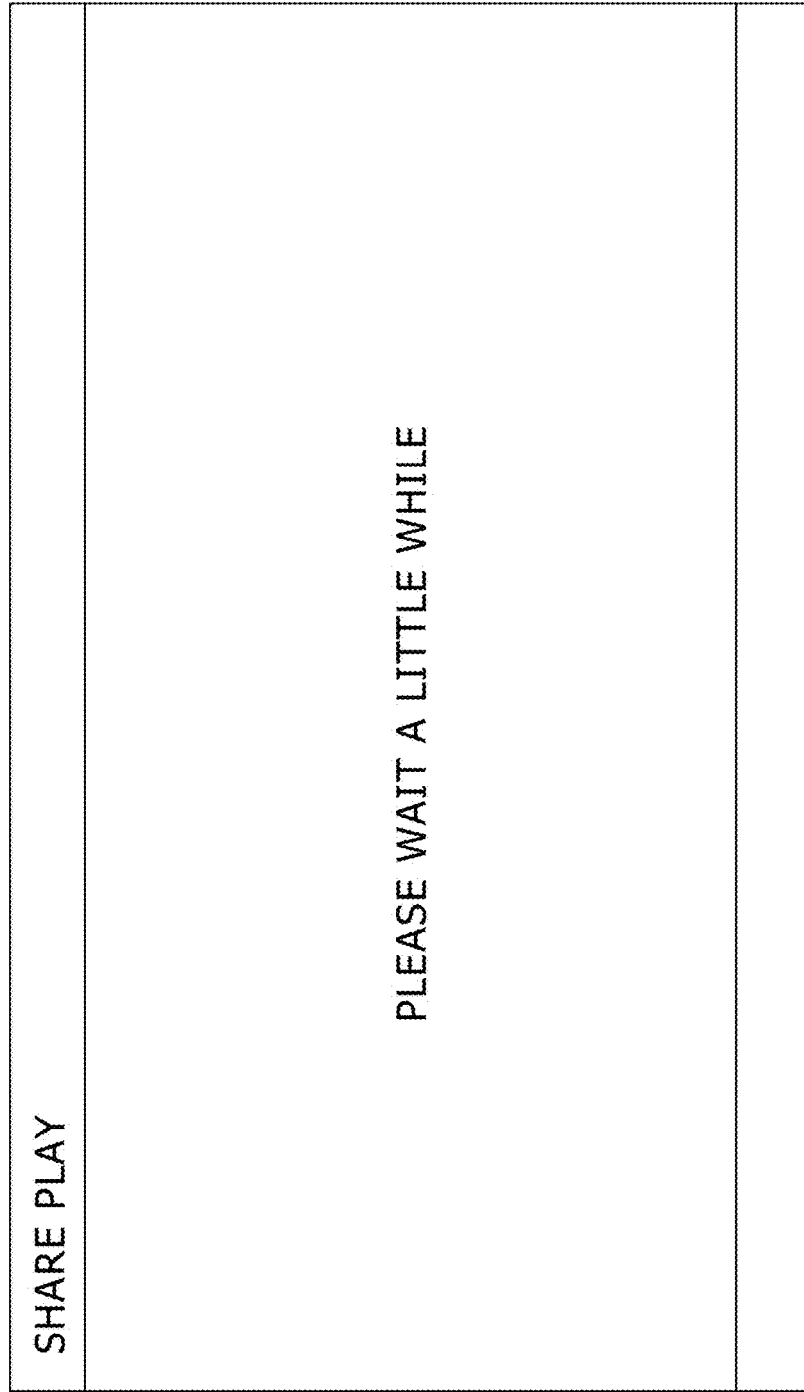
FIG. 21 is a view depicting an example of a screen image displayed on an outputting apparatus before shared play is started after it is decided that the user C is permitted to participate in the shared play.

FIG. 21 depicts an example of a screen image to be displayed on the outputting apparatus 4c after it is decided that participation of the user C is permitted until share play is started. If it is decided by the decision unit 132 in the information processing apparatus 10c that participation of the user C is permitted, then the share application is activated and the functions of the sharing processing unit 140c are implemented. At this time, the sharing processing unit 140c is placed into a state in which it waits for distribution of game image data from the information processing apparatus 10a, and the message screen image displaying unit 148 displays such a message as "PLEASE WAIT A LITTLE WHILE" on the outputting apparatus 4c.

Meanwhile, in the information processing apparatus 10a, the content execution unit 170a processes the game program on the basis of operation information inputted to the inputting apparatus 6 by the user A to generate image data of the game. Here, the content execution unit 170a may be the content (game program) itself.

If, at S30 of FIG. 19, the information acquisition unit 142a acquires the information indicating that the participation of the user C is permitted from the information processing apparatus 10c, then the mode setting unit 144 sets the mode of the share play to be executed to the share play 1 (share screen). As described hereinabove, the share play 1 is a mode in which an operation from the user C is not accepted while only distribution of game image data is performed, and is selected by default by the mode setting unit 144. The mode setting unit 144 notifies the control right management unit 156 of the selected mode. The control right management unit 156 manages the control right of the content, namely, the control right of the game, and if control right management unit 156 is notified that the sharing mode is the share play 1, then it operates so as to ignore operation data from the user C.

Figure 22:
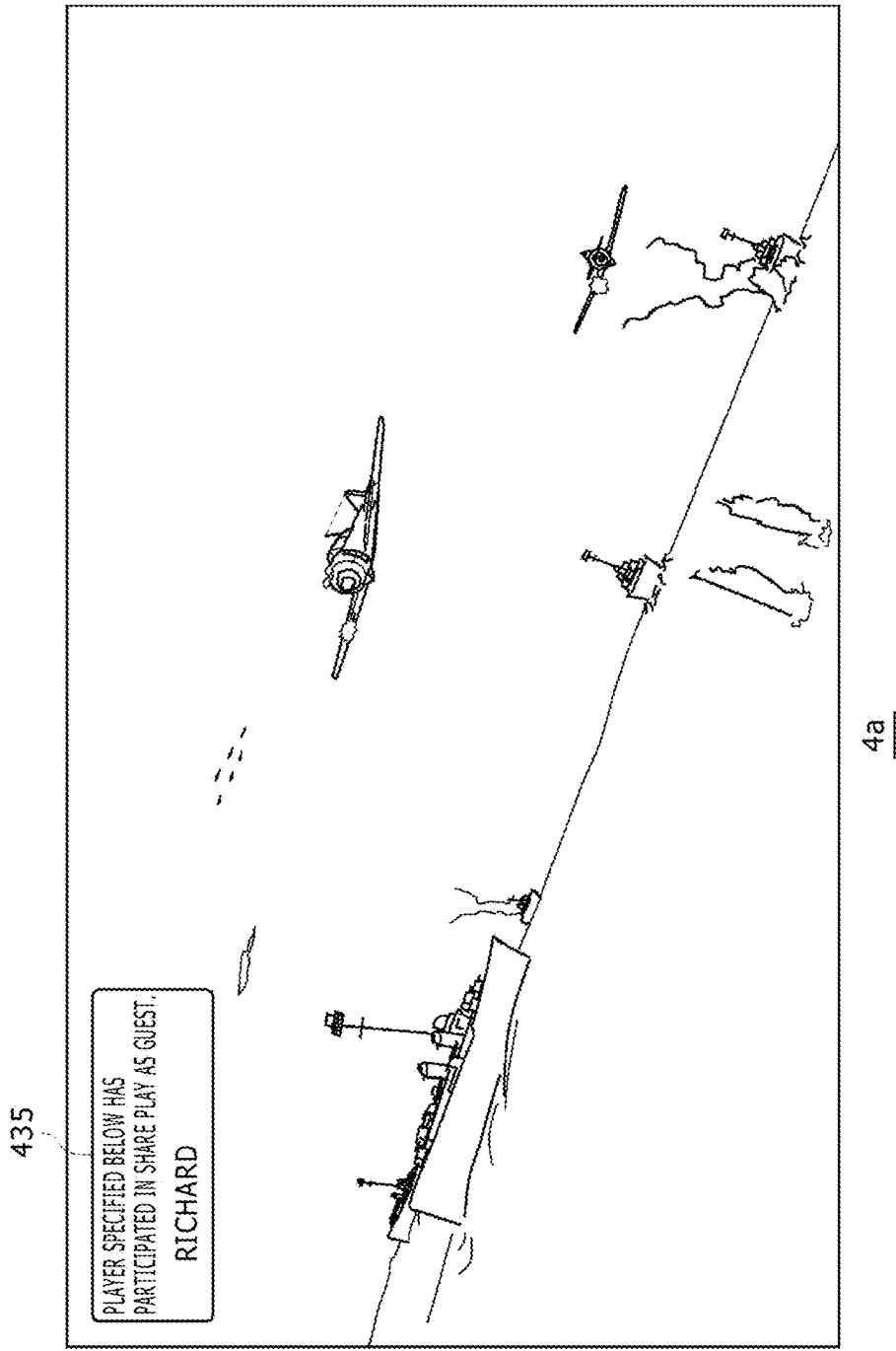
FIG. 22 is a view depicting an example of a game screen image displayed on an outputting apparatus.

FIG. 22 depicts an example of a game screen image displayed on the outputting apparatus 4a. If the information acquisition unit 142a acquires information representing that participation of the user C is permitted from the information processing apparatus 10c, then the notification unit 146a displays a participation notification message 435 which indicates that a guest user has participated into the share play in an overlapping relationship with the game screen image. Consequently, the user A can know that "RICHARD" has participated into the share play.

If the mode setting unit 144 sets the sharing mode of a game image to the share play 1 (share screen), then the distribution processing unit 180 transmits game image data to the information processing apparatus 10c together with information for specifying the set sharing mode (mode information). Preferably, the transmission of game image data is performed in synchronism with the outputting to the outputting apparatus 4a such that the user A and the user C can view the same game screen image. In the information processing apparatus 10c, the information acquisition unit 142c acquires the mode information and the image data acquisition unit 150 acquires the image data. The reproduction processing unit 152 reproduces the game image from the outputting apparatus 4c using the acquired image data. Consequently, the user C can view the same game screen image as that of the user A.

Figure 23:
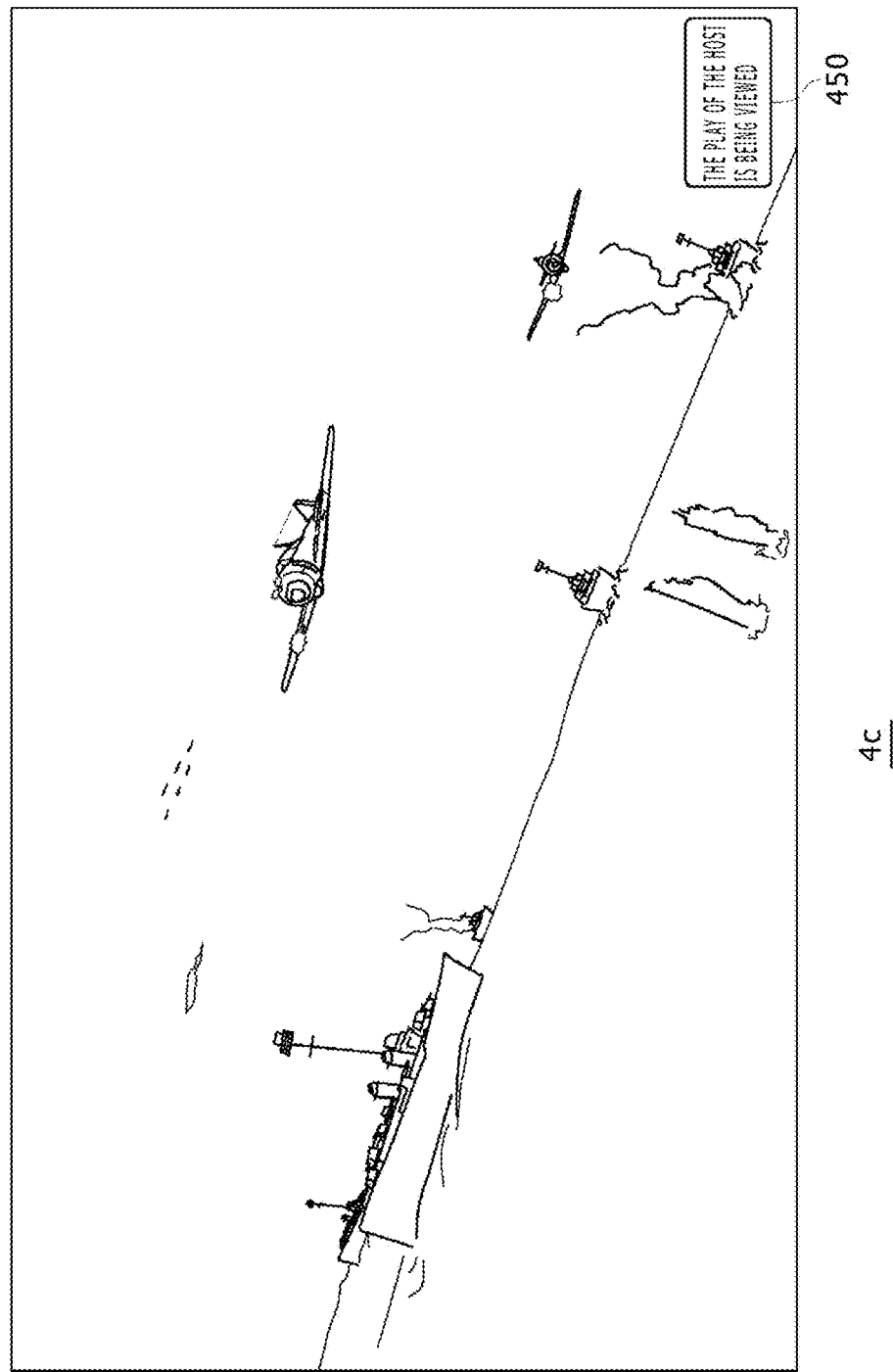
FIG. 23 is a view depicting a game screen image displayed to the user C.

FIG. 23 depicts a game screen image displayed to the user C. The reproduction processing unit 152 performs a reproduction process of the image data and outputs the reproduced image data to the outputting apparatus 4c. At this time, the notification unit 146c displays a state indicator 450 indicative of the mode of the share play in an overlapping relationship with the game screen image on the basis of the mode information. The state indicator 450 is information indicative of the mode of the sharing process and is conveyed to the user C in an associated relationship with the reproduced game screen image. Here, the state indicator 450 indicates that the mode of the sharing process is the share play 1. Here, the state indicator 450 is a text message "THE PLAY OF THE HOST IS BEING VIEWED," the massage may include also the user name and may be a message, for example, "THE PLAY OF TARO IS BEING VIEWED" or "THE PLAY OF TARO OF THE HOST IS BEING VIEWED."

Preferably, the notification unit 146c places the state indicator 450 at a position at which the state indicator 450 does not make an obstacle to the game screen image, for example, at a position in the proximity of a corner and displays the state indicator 450 translucently such that also the game screen image on which the state indicator 450 is overlapped can be viewed. If the user C views the state indicator 450, then the user C can recognize that share play is proceeding now and of which mode the share play is. The state indicator 450 may normally be displayed during share play.

In the present embodiment, during share play, although game image data of the information processing apparatus 10a is distributed to the information processing apparatus 10c, image data other than the game screen image is not distributed in principle. Also during share play, the user A can change over the screen image between the game screen image and a screen image other than the game screen image to display the screen image on the outputting apparatus 4a. However, during display of a screen image other than the game screen image, the information processing apparatus 10a notifies the information processing apparatus 10c that screen image data cannot be distributed. In the following, the information processing apparatus 10a is described in regard to a case in which the game screen image is changed over to display a member screen image.

If the member screen image displaying unit 124a displays a member screen image, then the state acquisition unit 160 detects that the game screen image has been changed over to a member screen image, and the notification unit 146a notifies the information processing apparatus 10c that a screen image other than the game screen image is displayed. The distribution processing unit 180 stops the distribution process of image data. If the information acquisition unit 142c in the information processing apparatus 10c acquires information indicating that a screen image other than the game screen image is displayed on the information processing apparatus 10a, then the message screen image displaying unit 148 displays a message screen image representing this on the outputting apparatus 4c.

Figure 24:
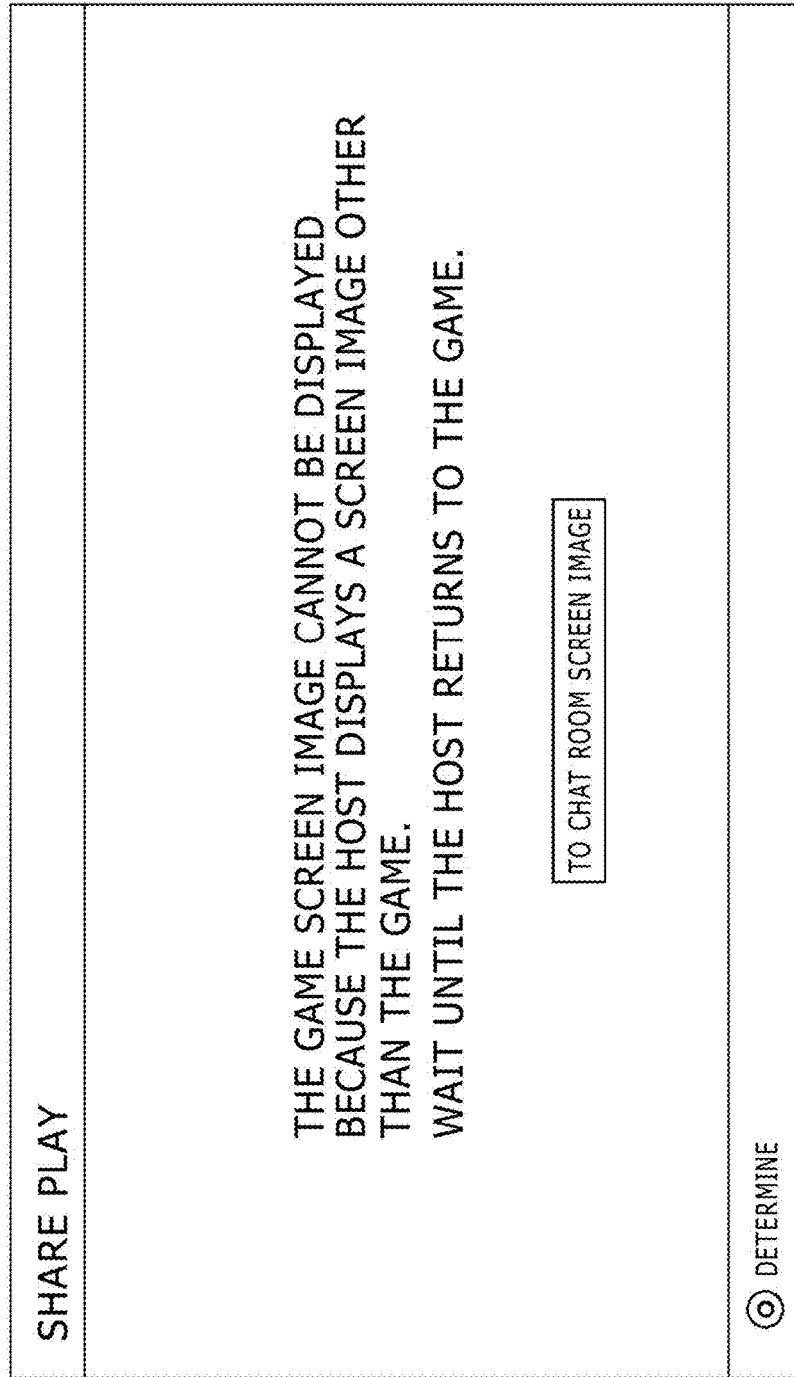
FIG. 24 is a view depicting a message screen image for the notification that a game screen image is disabled from being viewed during shared play.

FIG. 24 depicts a message screen image for the notification that the game screen image is disabled for viewing during share play. Viewing the message screen image, the user C may change over, for example, to a member screen image of the chat room or may enter waiting directly.

In the following, a member screen image displayed to the user A is described.

Figure 25:
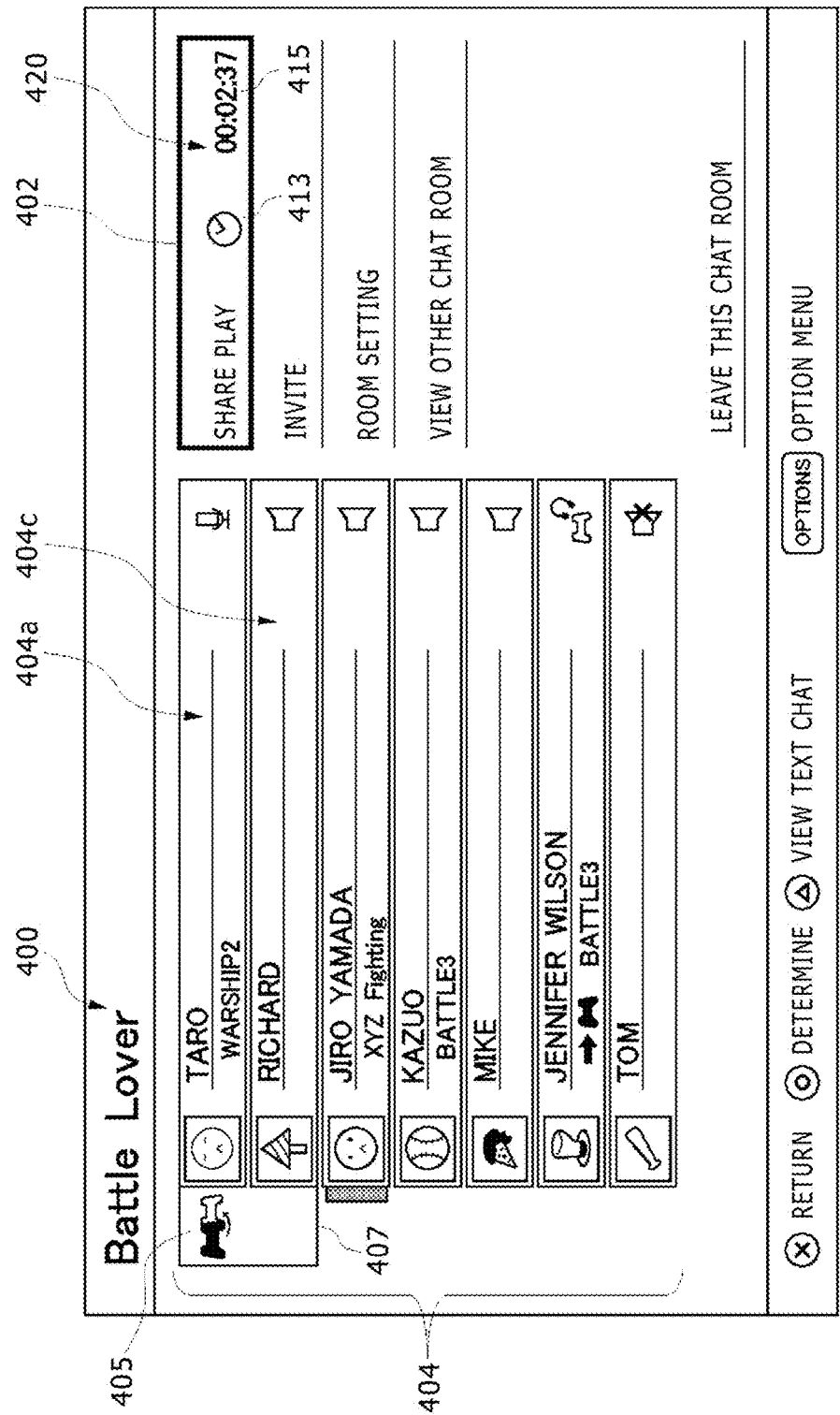
FIG. 25 is a view depicting an example of a member screen image of a chat room.

FIG. 25 depicts an example of a member screen image of a chat room. The member screen image depicted in FIG. 25 is to the user A. The information acquisition unit 122a acquires user information of the room members, in particular, information of the user name and the user icon of each member, the game title and the game icon being played, a chat situation and so forth. Then, the member screen image displaying unit 124a generates a member screen image of the chat room on the basis of the user information acquired by the information acquisition unit 122a and displays the member screen image on the outputting apparatus 4a.

As described hereinabove, the member screen image displaying unit 124a displays, in the member information area 404, the user information regarding the other members acquired by the information acquisition unit 122a in a juxtaposed relationship in the form of a list together with the user information regarding the user A itself. In the present example, a plurality of pieces of user information are displayed in a juxtaposed relationship in the vertical direction. It is to be noted that the member screen image displaying unit 124a displays the user information including information for specifying contents being played by the individual users (game titles).

The information acquisition unit 122a issues an inquiry about the share play to the sharing processing unit 140a and acquires, from the sharing processing unit 140a, information indicating that share play in which the user A is the host user and the user C is the guest user is being executed. In response to the information, the member screen image displaying unit 124a displays the user information such that it can be specified which user is the host user or the guest user. Here, the member screen image displaying unit 124a places an information displaying field 404a for the host user and an information displaying field 404c for the guest user are placed in a continuously juxtaposed relationship with each other in the member information area 404.

As depicted in FIG. 25, the member screen image displaying unit 124a displays the information displaying field 404a of the user A and the information displaying field 404c of the user C in a juxtaposed relationship such that the information displaying field 404a is positioned just above the information displaying field 404c. It is to be noted that the member screen image displaying unit 124a may place the information displaying field 404a of the host user at the uppermost position in the member information area 404. It is to be noted that, on the member screen image of any one of the users participating in the same chat room, the user information of the host user and the guest user is placed such that they are positioned at the uppermost position and the second uppermost position, respectively. Preferably, on the member screen image of a user who does not participate in share play, the other user information is displayed such that it can be specified which user other than the user itself is the host user or the guest user. Accordingly, since the user information of the host user is placed at the uppermost position and the user information of the guest user is placed at the second uppermost position, any member can readily confirm which two users are performing share play.

A share play mark 405 indicating the host user is added in an associated relationship with the information displaying field 404a of the host user. Further, in order to clearly indicate that "TARO" and "RICHARD" are carrying out share play, also a link 407 may be added so as to display the information displaying field 404a and the information displaying field 404c in an associated relationship with each other. Consequently, any member of the chat room can readily confirm the two users who are performing share play. It is to be noted that, although it is described in connection with FIG. 9 that, on the member screen image of the user A, the own user (user A) information is displayed at the lowermost position, when the own user is carrying out share play, the constraint is cancelled and the user information is displayed at an upper position.

It is to be noted that, in the information processing apparatus 10c of "RICHARD" who is the guest user, the content execution unit 170c is executing "SAMURAI Fighting." However, the member screen image displaying unit 124a non-displays the game title being executed by the information processing apparatus 10c of the guest user. This is because, even if "SAMURAI Fighting" is being executed in the information processing apparatus 10c, the user C is in share play of "WARSHIP2" with the user A and the game screen image of the share play is displayed actually on the outputting apparatus 4c of the user C. From this reason, the member screen image displaying unit 124a does not display content information of the guest user.

In the share play item 420, a check mark 413 indicating that share play is being performed is displayed and time information 415 indicative of a period of time within which the share play is carried out is displayed. In the present embodiment, the upper limit to the continuous implementation time period of share play is set to a predetermined period of time (for example, 60 minutes). Therefore, if the continuous implementation time period of the share play of the user A and the user C reaches 60 minutes, then the share play ends automatically. If the time information 415 indicates a period of time proximate to 60 minutes, then any other member in "Battle Lover" recognizes that the share play of the user A (TARO) and the user C (RICHARD) is likely to end, and a user who wants to perform share play with TARO after the end may wait for the end of the share play.

If the user A places the focus frame 402 on the share play item 420 and operates the determination button, then choices relating to the share play are displayed.

Figure 26:
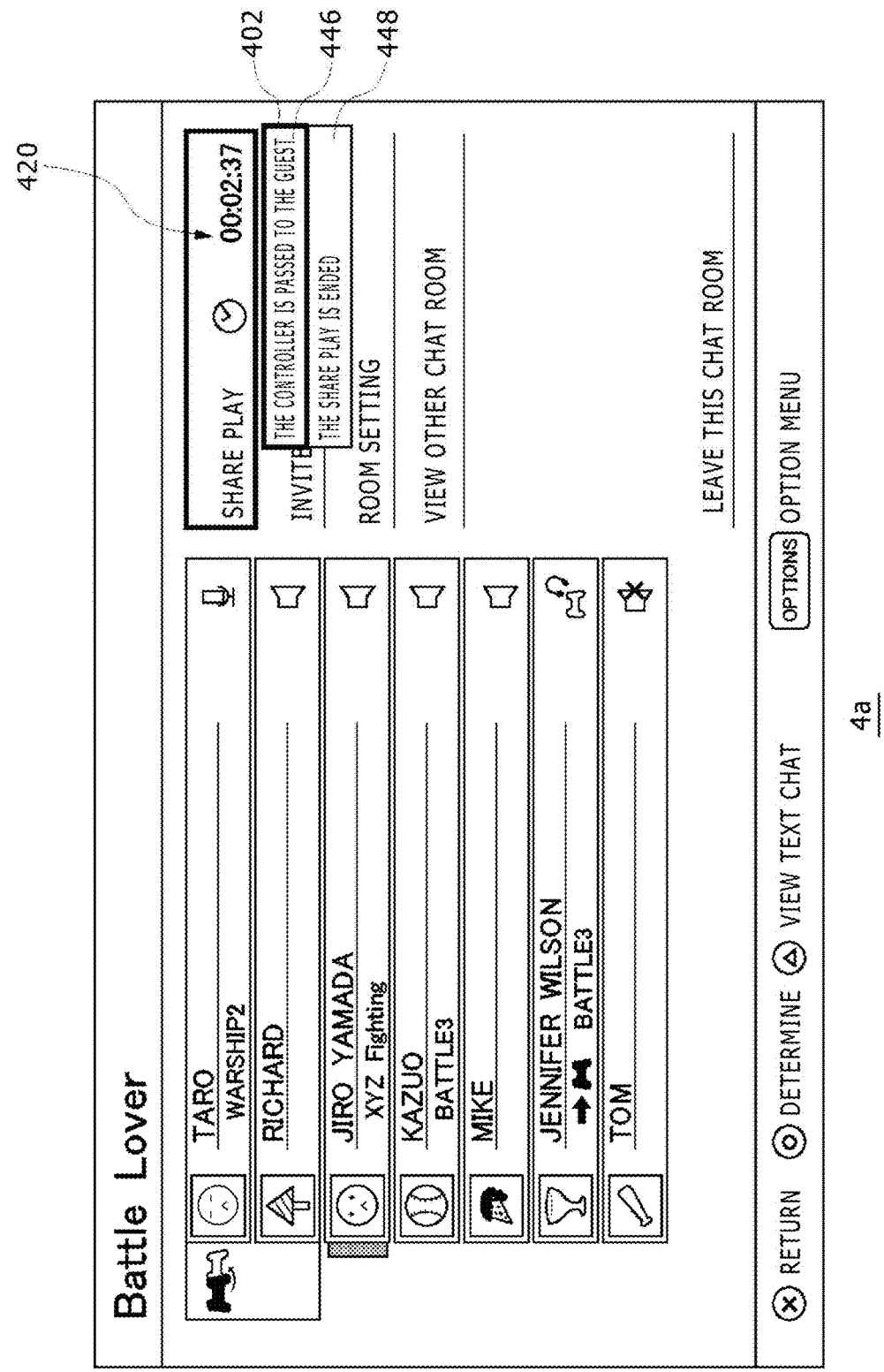
FIG. 26 is a view depicting a selection item displayed when a determination operation is performed with the focus frame placed on the share play item.

FIG. 26 depicts a selection item displayed when a determination operation is performed with the focus frame 402 placed on the share play item 420. The selection item includes a control right provision GUI 446 for selecting to pass the control right of the game in the share play to the guest and an end GUI 448 for selecting to end the share play. If the user A places the focus frame 402 on the control right provision GUI 446 and operates the determination button, then the dialog screen image displaying unit 162 displays a dialog screen image for allowing the user A to select a mode of share play on the outputting apparatus 4a.

FIG. 27 depicts an example of a dialog screen image. On the dialog screen image, a radio button is displayed. If a button 449a is selected and an OK button is operated, then the mode setting unit 144 sets the share play 2, namely, the assist play, as the mode of game image sharing. On the other hand, if another button 449b is selected and the OK button is operated, then the mode setting unit 144 sets the share play 3, namely, the joint play, as the mode of game image sharing. The mode setting unit 144 conveys the set mode to the control right management unit 156. Further, if the OK button is operated on the dialog screen image, then the display screen image of the outputting apparatus 4a is changed over to the game screen image. The state acquisition unit 160 detects that the screen image is changed over from the dialog screen image to the game screen image, and the distribution processing unit 180 resumes the distribution process of game image data. At this time, the distribution processing unit 180 distributes the game image data to the information processing apparatus 10c together with the information (mode information) for specifying the sharing mode set by the mode setting unit 144.

If the mode setting unit 144 sets the share play 2 as the sharing mode, then the information acquisition unit 142c in the information processing apparatus 10c acquires the mode information and the image data acquisition unit 150 acquires the image data. The reproduction processing unit 152 performs a reproduction process of the image data and outputs the resulting image data to the outputting apparatus 4c.

Figure 28:
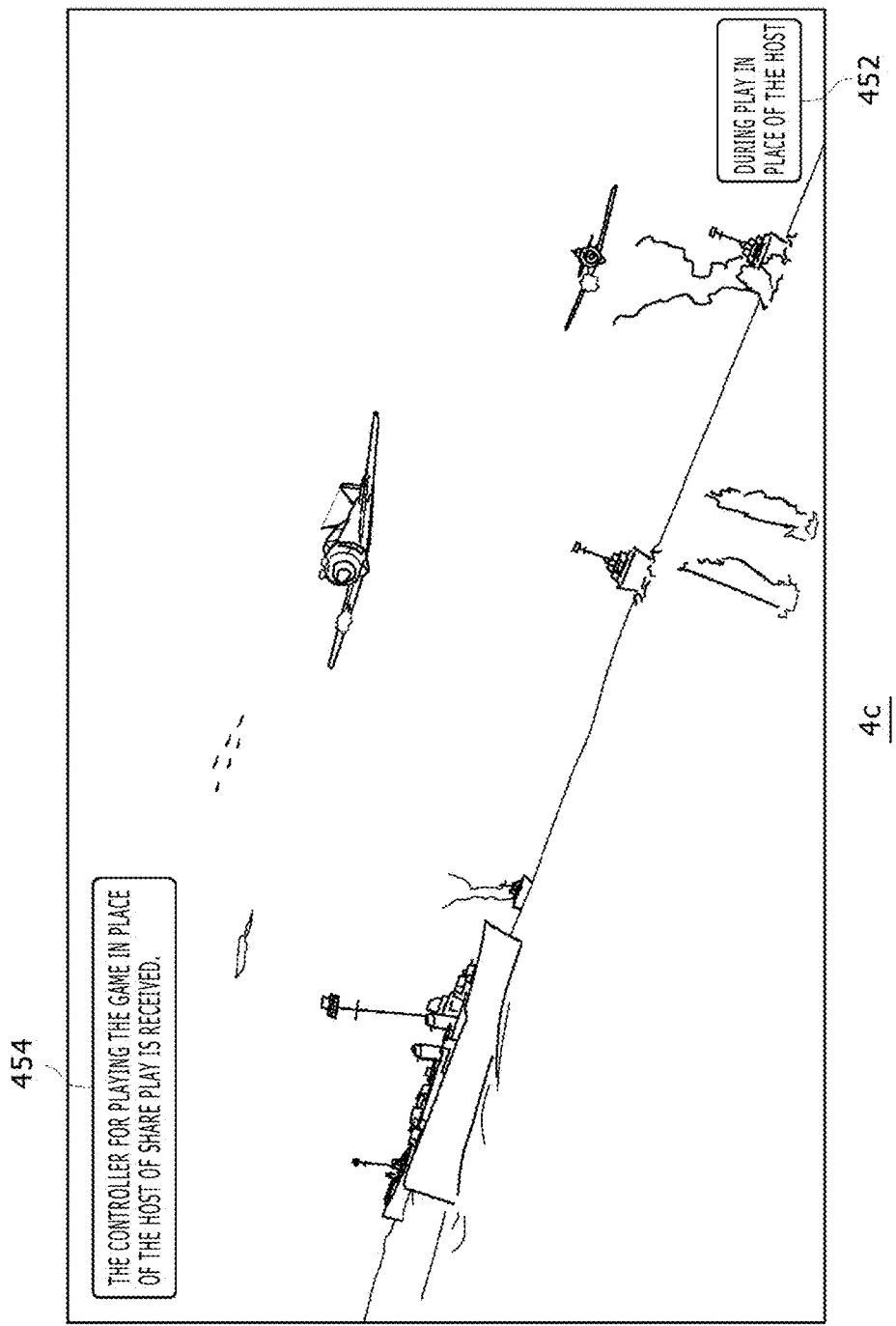
FIG. 28 is a view depicting a game screen image displayed to the user C.

FIG. 28 depicts a game screen image displayed to the user C. The reproduction processing unit 152 performs a reproduction process of the image data and outputs the resulting image data to the outputting apparatus 4c. The notification unit 146c displays a control right provision message 454 to notify the user C that the control right of the game is passed to the user C. It is to be noted that, if the user C operates some button of the inputting apparatus 6, then the notification unit 146c non-displays the control right provision message 454 and displays a state indicator 452 indicative of the mode of the share play in an overlapping relationship with the game screen image instead. Here, the state indicator 452 indicates "DURING PLAY IN PLACE OF THE HOST" and is displayed preferably translucently on the game screen image similarly to the state indicator 450 depicted in FIG. 23. It is to be noted that the state indicator 452 may be a message including a user name and may be such a message as "DURING PLAY IN PLACE OF TARO" or "DURING PLAY IN PLACE OF TARO OF THE HOST."

It is to be noted that the notification unit 146c may display the control right provision message 454 and the state indicator 452 simultaneously and then non-displays only the control right provision message 454 after lapse of a predetermined period of time. Alternatively, as described hereinabove, the control right provision message 454 and the state indicator 452 may be displayed selectively or both of them may be displayed normally.

Now, a case in which the mode setting unit 144 sets the share play 3 as the sharing mode is described. In the information processing apparatus 10c, the information acquisition unit 142c acquires mode information and the image data acquisition unit 150 acquires image data. The reproduction processing unit 152 performs a reproduction process for the image data and outputs the resulting image data to the outputting apparatus 4c.

Figure 29:
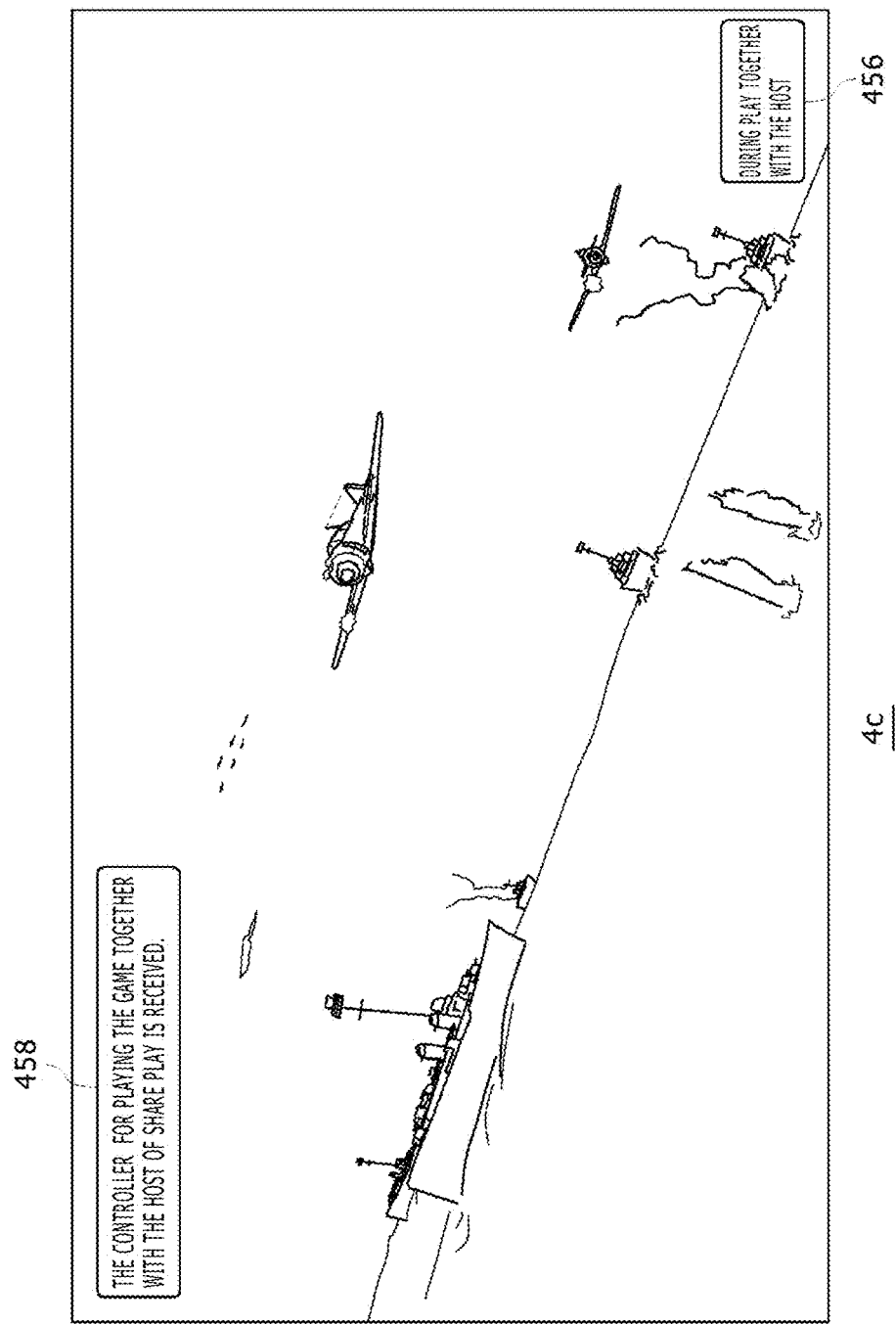
FIG. 29 is a view depicting another game screen image displayed to the user C.

FIG. 29 depicts a game screen image displayed to the user C. The reproduction processing unit 152 performs a reproduction process of the image data and outputs the resulting image data to the outputting apparatus 4c. At this time, the notification unit 146c displays a control right provision message 458 to notify the user C that the control right of the game is passed to the user C. It is to be noted that, if the user C operates some button of the inputting apparatus 6, then the notification unit 146c non-displays the control right provision message 458 and displays a state indictor 456 indicative of the mode of the share play in an overlapping relationship on the game screen image instead. Here, the state indictor 456 displays "DURING PLAY TOGETHER WITH THE HOST" and is displayed preferably translucently on the game screen image similarly to the state indicator 450 depicted in FIG. 23. It is to be noted that the state indicator 456 may be a message including a user name and may be such a message as, for example, "DURING PLAY TOGETHER WITH TARO" or "DURING PLAY TOGETHER WITH TARO OF THE HOST."

The notification unit 146c may display the control right provision message 458 and the state indictor 456 simultaneously and then non-display only the control right provision message 458 after lapse of a predetermined period of time. Alternatively, as described hereinabove, the control right provision message 458 and the state indictor 456 may be displayed selectively, or both of them may be displayed normally.

It is to be noted that, in the share play 3, both of the user A and the user C have the control right of the game, and accordingly, a notification that a new user is added to the game is issued. It is to be noted that, in the case of a game in which a user operates a player character, at the stage at which the user C receives the control right provision message 458, a player character of the user C is not generated as yet in the game. Therefore, the user C will select a player character of the user C itself anew in response to a request from the game to participate in the game.

In the share plays 2 and 3, the user C can operate the inputting apparatus 6 to play the game. The operation information of the inputting apparatus 6 by the user C is accepted by the acceptance unit 104c and is transmitted from the operation data transmission unit 154 to the information processing apparatus 10a. In the information processing apparatus 10a, the information acquisition unit 142a accepts the operation information of the user C.

The control right management unit 156 manages the control right of the game in response to the mode of the share play. During execution of the share play 2, the control right management unit 156 ignores the operation information by the user A and determines only the operation information by the user C as valid. Accordingly, during execution of the share play 2, the control right management unit 156 discards the operation information of the user A accepted by the acceptance unit 104a and determines the operation information of the user C acquired by the information acquisition unit 142a as valid. Then, the control right management unit 156 causes the operation information of the user C to be provided from the operation data provision unit 158 to the content execution unit 170a. Consequently, during execution of the share play 2, the game is operated only by the operation information of the user C.

On the other hand, during execution of the share play 3, the control right management unit 156 determines the operation information by the user A as valid and determines also the operation information by the user C as valid. At this time, the control right management unit 156 handles the operation information by the user A as operation information of the player 1 and handles the operation information by the user C as operation information of the player 2. Accordingly, the control right management unit 156 causes the operation information of the user A accepted by the acceptance unit 104a and the operation information of the user C acquired by the information acquisition unit 142a during execution of the share play 3 to be provided from the operation data provision unit 158 to the content execution unit 170a. Consequently, during execution of the share play 3, the game is operated by the operation information of the user A and the user C.

It is to be noted that, when the user A selects the share play 3, the user C may be able to participate in the share play 3 without restriction, or alternatively the user C may be able to participate in the share play 3 when a fixed condition is satisfied. For example, when the management server 5 provides, to users, a paid service by which a content is purchased at a discount price or a content can be enjoyed freely for a fixed period of time, the user C may be permitted to participate in the share play 3 if a condition that the user C subscribes to the paid service is satisfied. Therefore, if the user C does not subscribe to the paid service, then the message screen image displaying unit 148 may display a GUI for the subscription to the paid service to the user C and then execute the share play 3 after the user C subscribes to the paid service.

On the other hand, if the user A selects the share play 2, then the user C may be able to participate in the share play 2 without being subject to subscription to the paid service.

In the share play 2, the user C plays in a difficult scene or the like in place of the user A to the end, and the user C participates as a helper in a strong implication. Therefore, although it may be used as a condition for the user A to subscribe to the paid service in order to perform share play, preferably it is not used as a condition for the user C to subscribe to the paid service so far as the share play 1 or 2 is performed. It is to be noted that, when the user C performs the share play 3, it may be used as a condition for the user C to subscribe to the paid service as described above.

It is to be noted that, in a game, a restriction period for share play may be set from the point of view of spoiler prevention. The restriction period may be provided stepwise, and a period within which sharing itself of a game screen image is inhibited and another period within which controller operation is inhibited while sharing of a game screen image is permitted may be set. This restriction period may be set for each game scene by the game developer, and if the state acquisition unit 160 receives a notification that the game is within a sharing restriction period and of a type of the restriction from the game, then the state acquisition unit 160 notifies the control right management unit 156 and the distribution processing unit 180 of the information.

In the following, a period within which controller operation is inhibited while sharing of a game screen image is permitted is referred to as period of the first type, and another period within which sharing itself of a game screen image is inhibited is referred to as period of the second type. If the state acquisition unit 160 acquires information representing that the game is in a period of the first type from the game, then the state acquisition unit 160 notifies the control right management unit 156 that the game is in a period of the first type. At this time, the control right management unit 156 forcibly changes the mode of the share play to the share play 1 and manages the control right of the game. It is to be noted that, if the control right management unit 156 is notified from the state acquisition unit 160 that the restriction period ends, then the control right management unit 156 returns the mode of the share play to the original one and manages the control right of the game. The notification unit 146a notifies the information processing apparatus 10c that the game is in a period of the first type.

Figure 30:
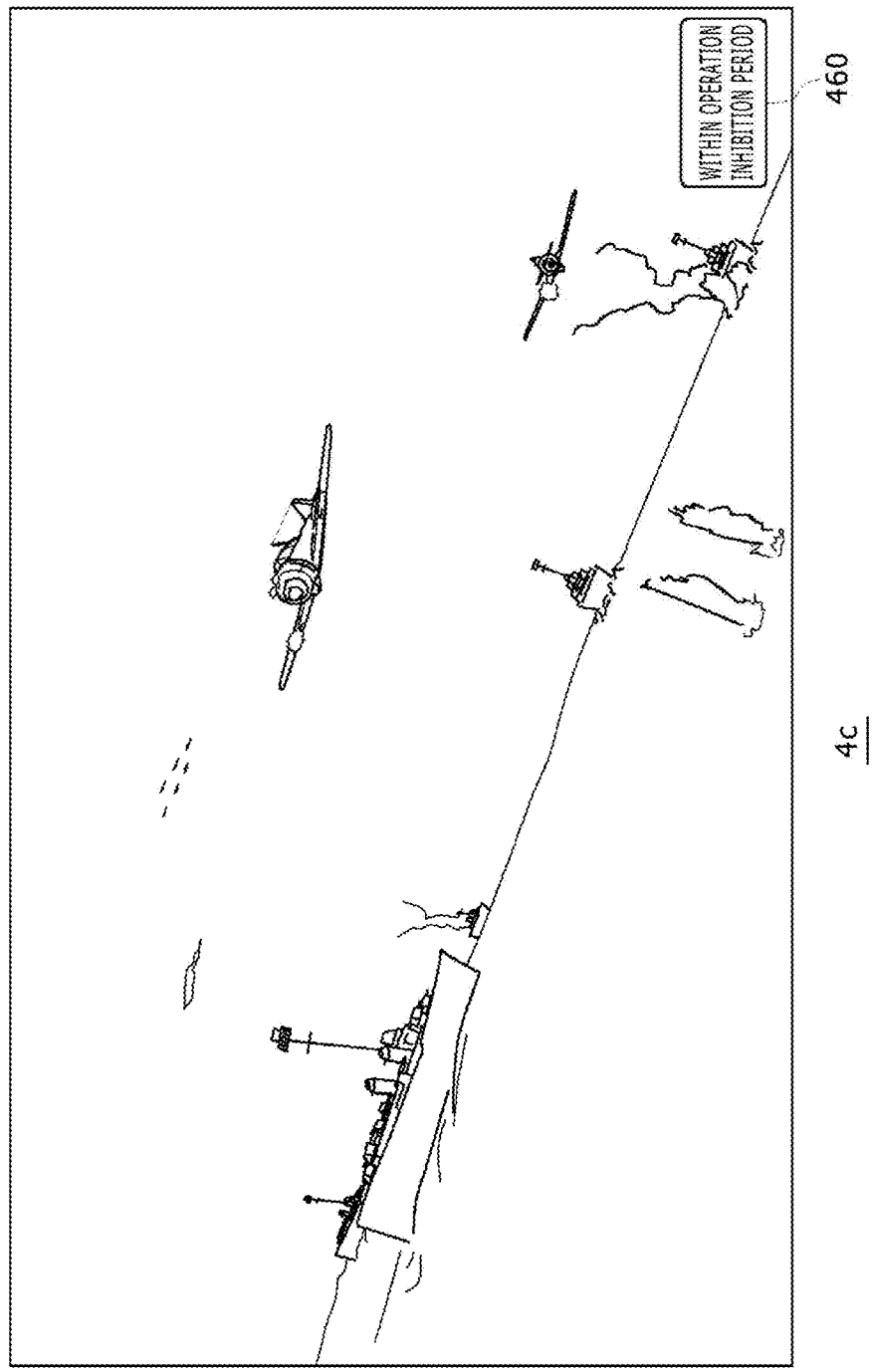
FIG. 30 is a view depicting a further game screen image displayed to the user C.

FIG. 30 depicts a game screen image displayed to the user C. If the information acquisition unit 142c acquires information representing that the game is within a period of the first type, then the notification unit 146c displays a state indicator 460 in an associated relationship with the game screen image to issue a notification that the content is within a sharing restriction period at present and an operation by the user C is inhibited. If the information acquisition unit 142c receives information representing that the restriction period has come to an end from the information processing apparatus 10a, then the notification unit 146c non-displays the state indicator 460. It is to be noted that, at this time, the control right management unit 156 in the information processing apparatus 10a is in a state in which operation information from the user C is acceptable, and the user C is permitted to operate the game. The notification unit 146c may display a state indicator indicative of the mode of the share play in place of the state indicator 460.

On the other hand, if the state acquisition unit 160 in the information processing apparatus 10a acquires information indicating that the game is in a period of the second type from the game, then the state acquisition unit 160 notifies the control right management unit 156 that the game is in a period of the second type and instructs the distribution processing unit 180 to stop distribution of game image data.

Consequently, the control right management unit 156 ignores the operation information from the user C and the distribution processing unit 180 stops distribution of game image data. Further, the notification unit 146a notifies the information processing apparatus 10c of information indicating that the game is in a period of the second type.

Figure 31:
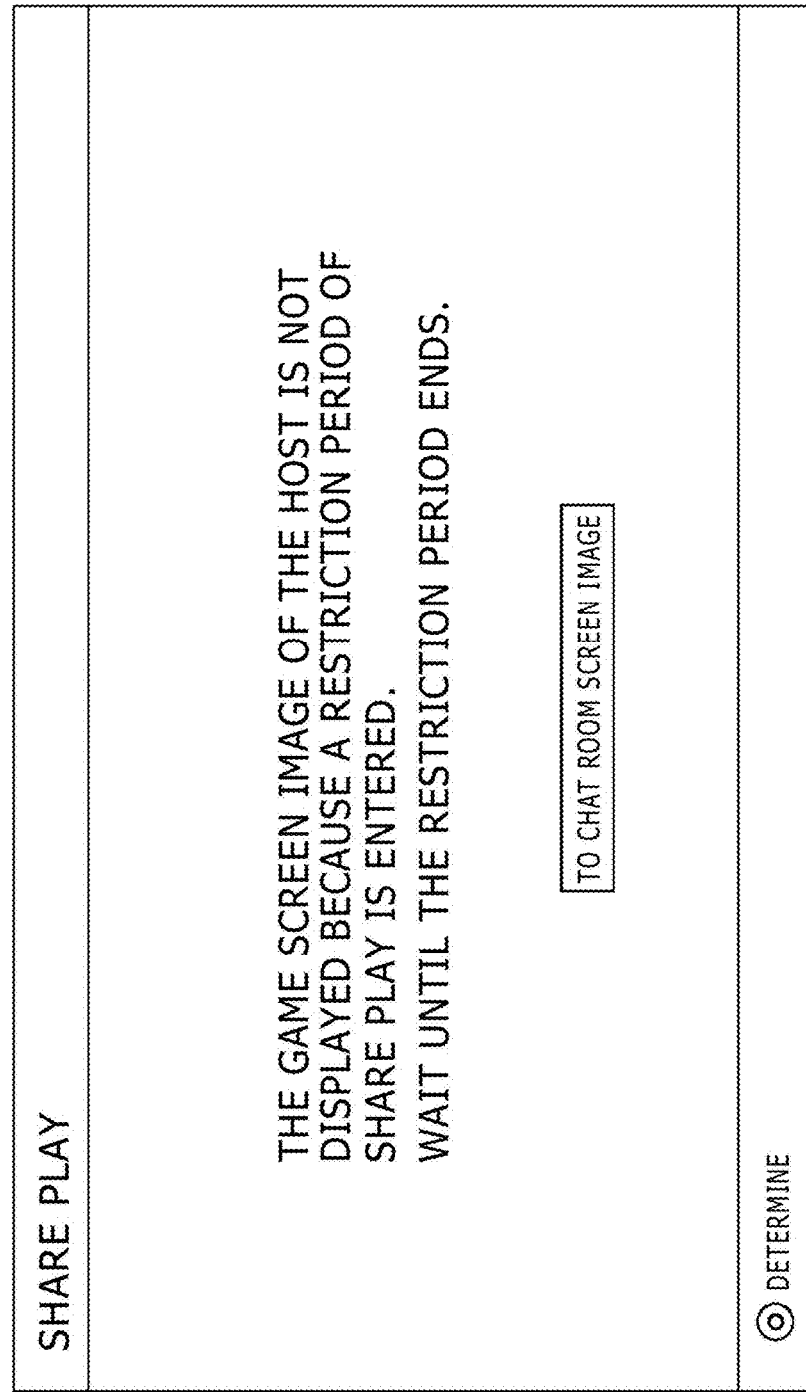
FIG. 31 is a view depicting a notification screen image displayed to the user C.

FIG. 31 depicts a notification screen image displayed to the user C. If the information acquisition unit 142c acquires information indicating that the game is in a period of the second type, then the reproduction processing unit 152 does not reproduce a game image (because distribution of a game image is in a stopped state) and the notification unit 146c displays information indicating that the game is in a sharing restriction period on the notification screen image. It is to be noted that, if the information acquisition unit 142c receives information indicating that the restriction period has come to an end from the information processing apparatus 10a, then the notification screen image displayed by the notification unit 146c is changed over to the game screen image reproduced by the reproduction processing unit 152. This is because, if the restriction period ends, then distribution of game image data by the distribution processing unit 180 is re-started in the information processing apparatus 10a. Further, at this time, since the control right management unit 156 is in a state in which it can accept operation information from the user C, the user C can operate the game.

As described above, if the user C participates in share play of the user A, then a game screen image can be shared, and when the share play 2 or 3 is performed, the control right of the game is passed to the user C. Therefore, the user C can thereafter operate the game. When the share play is to be ended, only it is necessary for one of the users A and C to select the end GUI 448 on the member screen image of the chat room (refer to FIG. 26) or to end the chat application. Since the share play is executed assuming that two users participate in the same chat room, if one of the users ends the chat application, then also the share play ends simultaneously.

The present invention has been described in connection with the embodiment. This embodiment is illustrative, and it can be recognized by those skilled in the art that various modifications are possible in combination of the components and various processes of the embodiment and also such modifications fall within the scope of the present invention. For example, while, in the embodiment, game software is presented as an example of a content, the content may be a still picture or a moving picture which can be edited by a user operation or may be a movie or the like which allows a user operation for fast feeding or pause.

If the mode setting unit 144 sets a mode of share play, then information which specifies the mode set by the mode setting unit 144 may be displayed on the member screen image depicted in FIG. 25 or the like. If the mode setting unit 144 provides the information which specifies the set mode to the chat execution unit 120a and the information acquisition unit 122a acquires the mode specification information, then the member screen image displaying unit 124a displays the information indicative of the mode of share play on the member screen image. Since the field for inputting a title name at the lower stage than the user name is blank in the information displaying field 404c of the guest user, the member screen image displaying unit 124a may display the information indicative of the mode of share play in the blank field.

Further, while it is described in the embodiment that share play is performed only between two users, sharing of image data among three or more users may be performed in a share screen mode. Further, while in the present embodiment share play is performed assuming that the two users are in chat connection, this is nothing but an explanation taking it as an example that the two users are in chat connection as an entrance to share play, and two users who perform share play may not be in chat connection as an assumption therefor.

REFERENCE SIGNS LIST

1 . . . Information processing system, 5 . . . Management server, 6 . . . Inputting apparatus, 10 . . . Information processing apparatus, 100a, 100c . . . Processing unit, 102a, 102c . . . Communication unit, 104a, 104c . . . Acceptance unit, 110a . . . System screen image generation unit, 120a, 120c . . . Chat execution unit, 122a, 122c . . . Information acquisition unit, 124a, 124c . . . Member screen image displaying unit, 126a . . . Starting screen image displaying unit, 128a, 128c . . . Notification unit, 130 . . . Inquiry unit, 132 . . . Decision unit, 140a, 140c . . . Sharing processing unit, 142a, 142c . . . Information acquisition unit, 144 . . . Mode setting unit, 146a, 146c . . . Notification unit, 148 . . . Message screen image displaying unit, 150 . . . Image data acquisition unit, 152 . . . Reproduction processing unit, 154 . . . Operation data transmission unit, 156 . . . Control right management unit, 158 . . . Operation data provision unit, 160 . . . State acquisition unit, 162 . . . Dialog screen image displaying unit, 170a, 170c . . . Content execution unit, 180 . . . Distribution processing unit

INDUSTRIAL APPLICABILITY

The present invention can be utilized in fields relating to a sharing process of a content image.

The invention claimed is:

1. An information processing apparatus operated by a user, comprising:
an information acquisition unit configured to acquire respective user information relating to a plurality of different users;
a display unit configured to display at least some of the user information relating to each of the plurality of different users to the user; and
a content execution unit configured to execute an application program and produce one or more content images via the participation of the user but not any of the plurality of different users with whom the one or more content images will be shared,
wherein, when one or more of the content images of the user is shared with a particular one of the different users among the plurality of different users, during the participation of the user and the execution of the application program but not during participation of any of the plurality of different users, the display unit displays a participation notification to the user, which includes at least some of the respective user information relating to the particular one of the different users such that the user may be notified as to specifically which of the plurality of different users received the shared content image from the user.

2. The information processing apparatus according to claim 1, wherein the display unit displays user information relating to the user and the user information relating to the different user in a juxtaposed relationship with each other.

3. The information processing apparatus according to claim 2, wherein the display unit arranges user information relating to user and user information relating to at least one of the plurality of different users in succession.

4. The information processing apparatus according to claim 1, wherein the display unit displays the user information including information for the user specifying a content being executed, and does not display content information of at least one of the plurality of different users.

5. The information processing apparatus according to claim 1, wherein the display unit displays information indicative of a sharing mode of the content image between the user and at least one of the plurality of different users.

6. A user information displaying method of displaying user information on an information processing apparatus operated by a user, comprising:
acquiring respective user information relating to a plurality of different users; and
displaying at least some of the user information relating to each of the plurality of different users to the user; and
executing an application program and produce one or more content images via the participation of the user but not any of the plurality of different users with whom the one or more content images will be shared,
wherein, when one or more of the content images of the user is shared with a particular one of the different users among the plurality of different users, during the participation of the user and the execution of the application program but not during participation of any of the plurality of different users, the displaying displays a participation notification to the user, which includes at least some of the respective user information relating to the particular one of the different users such that the user may be notified as to specifically which of the plurality of different users received the shared content image from the user.

7. A computer operated by a user, the computer executing a computer program, which when executed by the computer, causes the computer to carry out actions, comprising:
by an information acquisition unit, acquiring respective user information relating to a plurality of different users; and
by a display unit, displaying at least some of the user information relating to each of the plurality of different users to the user; and
by a content execution unit, executing an application program and produce one or more content images via the participation of the user but not any of the plurality of different users with whom the one or more content images will be shared,
wherein, when one or more of the content images of the user is shared with a particular one of the different users among the plurality of different users, during the participation of the user and the execution of the application program but not during participation of any of the plurality of different users, the displaying displays a participation notification to the user, which includes at least some of the respective user information relating to the particular one of the different users such that the user may be notified as to specifically which of the plurality of different users received the shared content image from the user.

8. A non-transitory computer-readable recording medium containing a computer program, which when executed by a computer operated by a user, causes the computer to carry out actions, comprising:
by an information acquisition unit, acquiring respective user information relating to a plurality of different users; and by a display unit, displaying at least some of the user information relating to each of the plurality of different users to the user; and by a content execution unit, executing an application program and produce one or more content images via the participation of the user but not any of the plurality of different users with whom the one or more content images will be shared, wherein, when one or more of the content images of the user is shared with a particular one of the different users among the plurality of different users, during the participation of the user and the execution of the application program but not during participation of any of the plurality of different users, the displaying displays a participation notification to the user, which includes at least some of the respective user information relating to the particular one of the different users such that the user may be notified as to specifically which of the plurality of different users received the shared content image from the user.

9. The information processing apparatus of claim 1, wherein the participation notification is presented to the user overlaying the content image that was shared.

* * * * *